US012289565B2

(12) United States Patent
Mizukoshi

(10) Patent No.: US 12,289,565 B2
(45) Date of Patent: Apr. 29, 2025

(54) COMMUNICATION CONTROL DEVICE, COMMUNICATION CONTROL SYSTEM, COMMUNICATION CONTROL METHOD, AND NON-TRANSITORY COMPUTER-READABLE MEDIUM STORING PROGRAM

(71) Applicant: NEC Corporation, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 135 days.

(21) Appl. No.: 18/023,294

(22) PCT Filed: Sep. 30, 2020

(86) PCT No.: PCT/JP2020/037203
§ 371 (c)(1),
(2) Date: Feb. 24, 2023

(87) PCT Pub. No.: WO2022/070327
PCT Pub. Date: Apr. 7, 2022

(65) Prior Publication Data
US 2024/0031535 A1    Jan. 25, 2024

(51) Int. Cl.
*H04L 9/40* (2022.01)
*H04L 65/80* (2022.01)
(Continued)

(52) U.S. Cl.
CPC ......... *H04N 7/181* (2013.01); *H04L 63/0457* (2013.01); *H04L 65/80* (2013.01)

(58) Field of Classification Search
CPC .. H04N 7/181; H04N 21/647; H04L 63/0457; H04L 65/80
See application file for complete search history.

(56) References Cited

U.S. PATENT DOCUMENTS 8,988,491 B2 * 3/2015 Yamashita ............. H04N 7/148
348/14.09
10,050,856 B2 * 8/2018 Oshiba ................ H04L 43/0882
(Continued)

FOREIGN PATENT DOCUMENTS

JP    2007-329707 A    12/2007
JP    2012-080518 A    4/2012
(Continued)

OTHER PUBLICATIONS

International Search Report for PCT Application No. PCT/JP2020/037203, mailed on Dec. 15, 2020.

*Primary Examiner* — Ahmed A Berhan

(57) ABSTRACT

A communication control device includes an acquisition unit configured to acquire first video quality information of first video data transmitted from a first imaging device to the display device and second video quality information of second video data transmitted from a second imaging device to the display device; a band estimation unit configured to estimate an available communication band of the second video data from the second video quality information; a band prediction unit configured to predict an available communication band of the first video data based on a reception time difference between the first and second video quality information and predict a common available communication band based on a prediction result thereof and an estimation result; and a determination unit configured to determine transmission conditions of the respective items of first and second video data based on the available communication band common to the first and second imaging devices.

18 Claims, 15 Drawing Sheets

(51) Int. Cl.
*H04N 7/18* (2006.01)
*H04N 21/647* (2011.01)

(56) References Cited

U.S. PATENT DOCUMENTS

2012/0056975 A1 3/2012 Yamashita et al.
2016/0254972 A1 9/2016 Oshiba
2017/0048124 A1 2/2017 Nishikawa

FOREIGN PATENT DOCUMENTS

WO 2015/064108 A1 5/2015
WO 2015/174069 A1 11/2015

* cited by examiner

COMMUNICATION CONTROL DEVICE, COMMUNICATION CONTROL SYSTEM, COMMUNICATION CONTROL METHOD, AND NON-TRANSITORY COMPUTER-READABLE MEDIUM STORING PROGRAM

This application is a National Stage Entry of PCT/JP2020/037203 filed on Sep. 30, 2020, the contents of all of which are incorporated herein by reference, in their entirety.

TECHNICAL FIELD

The present invention relates to a communication control device, a communication control system, a communication control method, and a non-transitory computer-readable medium storing a program.

BACKGROUND ART

Patent Literature 1 discloses a video wireless transmission device that optimizes video qualities by following a change in transmission capacity in a wireless section when video streaming data is transmitted in the wireless section.

Patent Literature 2 discloses a video transmission system that preferentially transmits information important for a video by combining a network bandwidth adjustment technique for adjusting a transmission data amount according to a network state and an image recognition technique for detecting contents appearing in a transmission video.

CITATION LIST

Patent Literature

Patent Literature 1: Japanese Unexamined Patent Application Publication No. 2007-329707
Patent Literature 2: Japanese Unexamined Patent Application Publication No. 2012-080518

SUMMARY OF INVENTION

Technical Problem

In Patent Literature 1, an adaptive control unit provided in a transmission-side transmission device optimizes video qualities of video data without referring to a reception status of video data in a reception-side transmission device. That is, in Patent Literature 1, the information relating to the reception status of the video data in the reception-side transmission device is not fed back to the transmission-side transmission device. Therefore, there is a problem that the transmission-side transmission device cannot accurately set the transmission condition of the video data transmitted from the transmission-side transmission device to the reception-side transmission device.

In addition, in Patent Literature 2, a terminal device on a transmission side compresses and encodes video data without referring to a reception status of the video data in a terminal device on the reception side. That is, in Patent Literature 2, the information relating to the reception status of the video data in the terminal device on the reception side is not fed back to the terminal device on the transmission side. Therefore, there is a problem that the terminal device on the transmission side cannot accurately set the transmission condition of the video data transmitted to the terminal device on the reception side.

The present disclosure has been made to solve such a problem and has an object of providing a communication control device, a communication control system, a communication control method, and a non-transitory computer-readable medium storing a program, which can accurately set communication conditions.

Solution to Problem

According to the present disclosure, a communication control device includes an acquisition unit configured to acquire first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network; a band estimation unit configured to estimate an available communication band of the second video data at reception time point of the second video data by the display device from the second video quality information acquired by the acquisition unit; a band prediction unit configured to predict an available communication band of the first video data transmitted from the first imaging device to the display device based on a reception time difference between the first and second video quality information and predict an available communication band common to the first and second imaging devices based on the prediction result thereof and the estimation result by the band estimation unit; and a determination unit configured to determine transmission conditions of the respective items of first and second video data transmitted from the first and second imaging devices to the display device based on the available communication band common to the first and second imaging devices predicted by the band prediction unit.

According to the present disclosure, a communication control method includes an acquisition step of acquiring first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network; a band estimation step of estimating an available communication band of the second video data at reception time point of the second video data by the display device from the second video quality information acquired in the acquisition step; a band prediction step of predicting an available communication band of the first video data transmitted from the first imaging device to the display device based on a reception time difference between the first and second video quality information and predicting an available communication band common to the first and second imaging devices based on the prediction result thereof and the estimation result in the band estimation step; and a determination step of determining transmission conditions of the respective items of first and second video data transmitted from the first and second imaging devices to the display device based on the available communication band common to the first and second imaging devices predicted in the band prediction step.

According to the present disclosure, a non-transitory computer-readable medium storing a communication control program for executing an acquisition process of acquiring first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network; a band estimation process of estimating an available communication band of the second video data at reception time point of the second video data by the display device from the second video quality information acquired in the acquisition process; a band prediction process of predicting an available communication band of the first video data transmitted from the first imaging device to the display device based on a reception time difference between the first and second video quality information and predicting an available communication band common to the first and second imaging devices based on the prediction result thereof and the estimation result in the band estimation process; and a determination process of determining transmission conditions of the respective items of first and second video data transmitted from the first and second imaging devices to the display device based on the available communication band common to the first and second imaging devices predicted in the band prediction process.

Advantageous Effects of Invention

According to the present disclosure, it is possible to provide a communication control device, a communication control system, a communication control method, and a non-transitory computer-readable medium storing a program, which can accurately set communication conditions.

EXAMPLE EMBODIMENT

Figure 1:
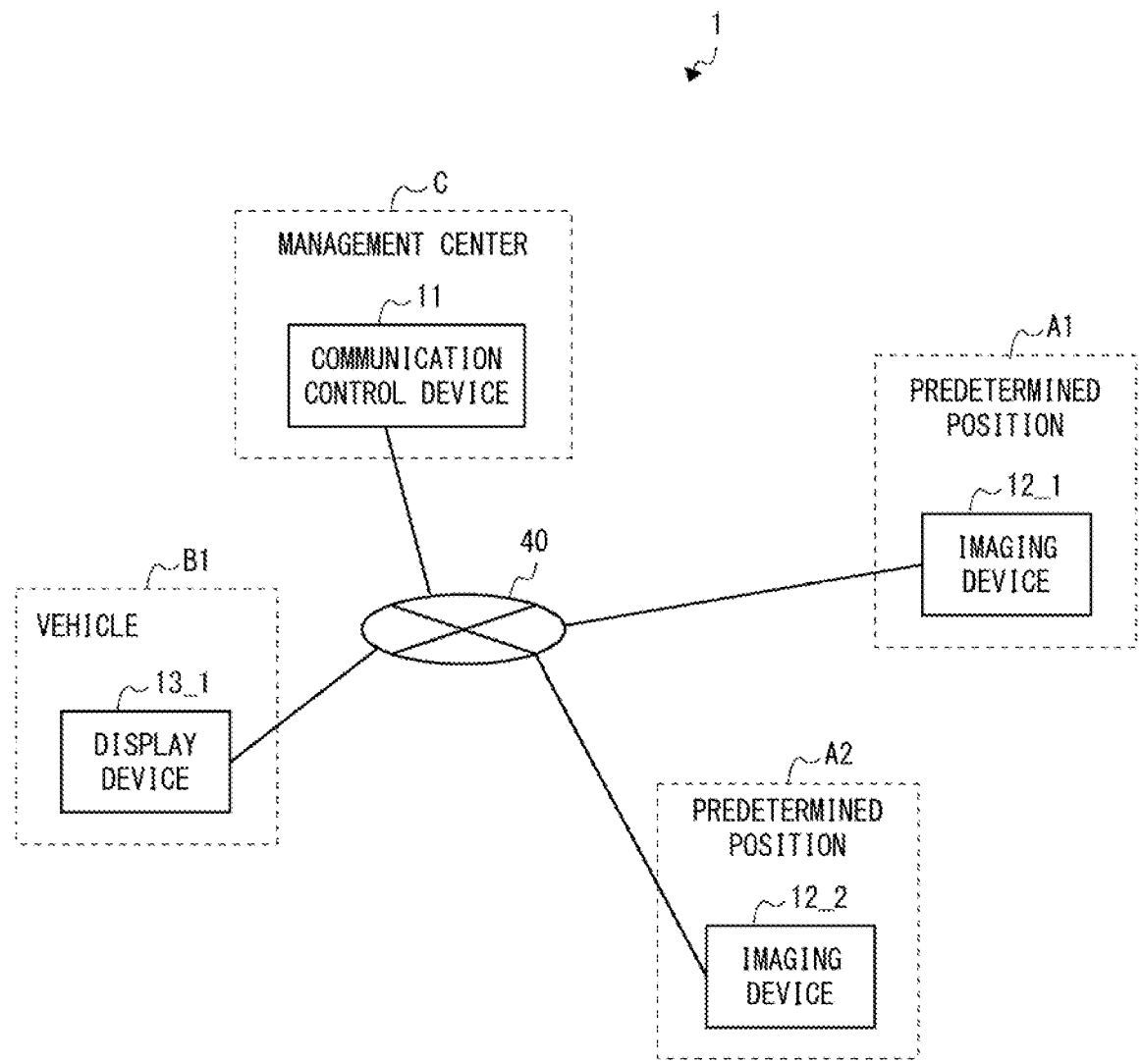
FIG. 1 is a block diagram illustrating a configuration example of a communication control system according to a first example embodiment.

Hereinafter, example embodiments of the present disclosure are described in detail with reference to the drawings. In the drawings, the same or corresponding elements are denoted by the same reference signs, and an overlapping description is omitted as necessary for clarity of description.
<Prior Study by Inventor>

Before a communication control device according to a first example embodiment and a communication control system including the communication control device will be described, contents examined in advance by the inventor will be described.

Figure 13:
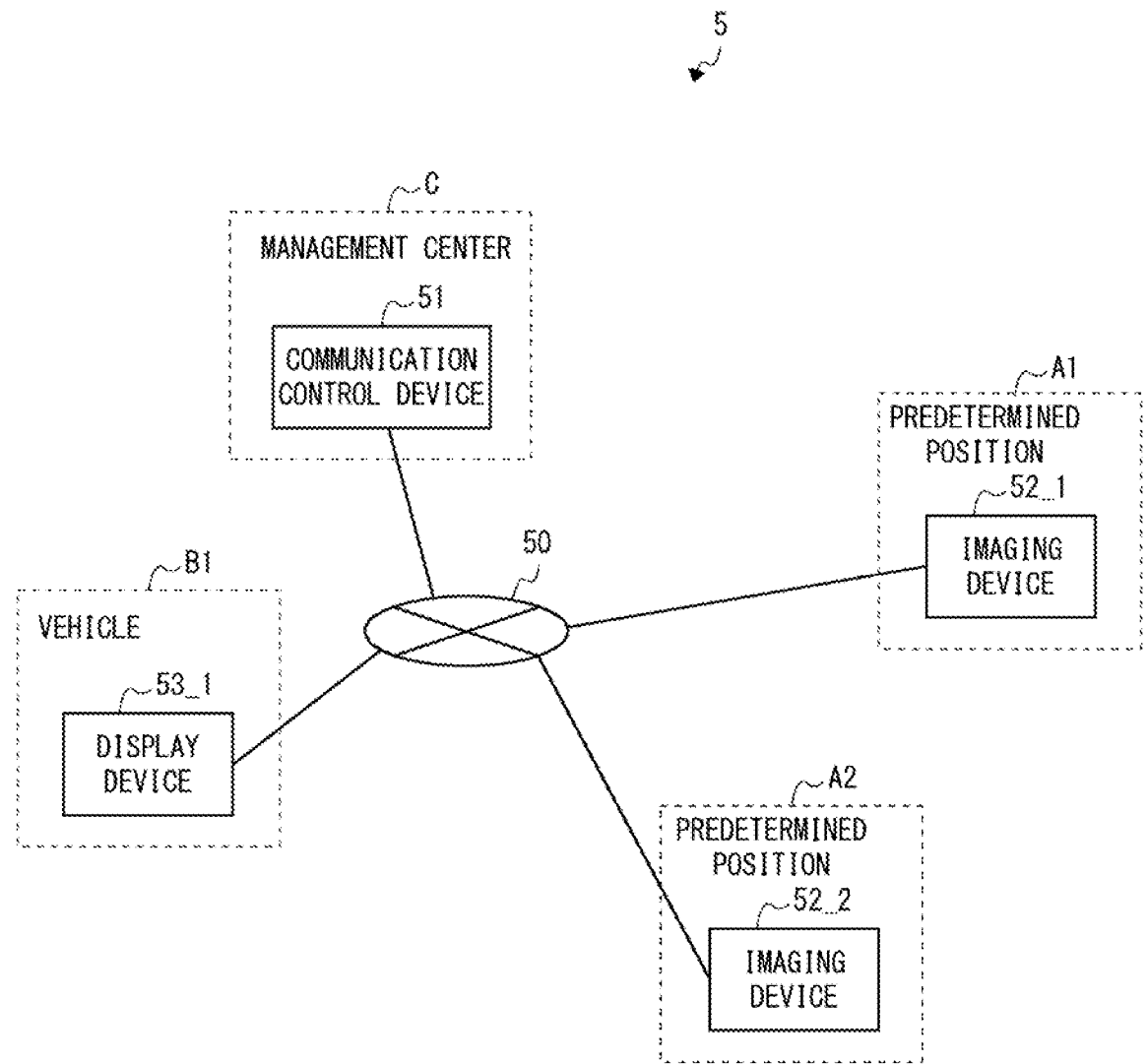
FIG. 13 is a block diagram illustrating a configuration example of a communication control system in a concept stage.

FIG. 13 is a block diagram illustrating a configuration example of a communication control system 5 in a concept stage before reaching the first example embodiment.

As illustrated in FIG. 13, the communication control system 5 includes a communication control device 51, a plurality of imaging devices 52_1 to 52_N (N is an integer of 2 or more), a display device 53_1, and a network 50. Here, a case where two imaging devices 52_1 and 52_2 are provided is described as an example. The imaging devices 52_1 and 52_2, the display device 53_1, and a communication control device 51 are connected to each other via the network 50.

The imaging device 52_1 is a so-called camera and is installed, for example, at a predetermined position A1. The imaging device 52_2 is a so-called camera and is installed, for example, at a predetermined position A2. Imaging priorities are set to the respective imaging devices 52_1 and 52_2. As the imaging priority is higher, it is required to generate video data with higher image qualities, and as the imaging priority is lower, it is allowed to generate video data with lower image qualities. Furthermore, in the present example, a case where the imaging device 52_1 is installed at a position farther from the relay point of the network 50 than the imaging device 52_2 is described. Therefore, in the present example, the distance (communication time) between the imaging device 52_1 and the communication control device 11 is longer than the distance (communication time) between the imaging device 52_2 and the communication control device 11.

In addition, the imaging device 52_1 has a function of detecting video quality information I1 of the video data based on a transmission status of the video data transmitted to the display device 53_1 and a reception status of the video data on the display device 53_1 fed back from the display device 53_1. The video quality information I1 is, for example, a difference between the number of packets of the video data transmitted from the imaging device 52_1 to the display device 53_1 and the number of packets of the video data received by the display device 53_1.

In the same manner, the imaging device 52_2 has a function of detecting video quality information I2 of the video data based on the transmission status of the video data transmitted to the display device 53_1 and the reception status of the video data on the display device 53_1 fed back from the display device 53_1. The video quality information I2 is, for example, a difference between the number of packets of the video data transmitted from the imaging device 52_2 to the display device 53_1 and the number of packets of the video data received by the display device 53_1.

The display device 53_1 includes a monitor that displays videos imaged by the respective imaging devices 52_1 and 52_2 and is mounted on, for example, a vehicle B1. The display device 53_1 may display videos imaged by the respective imaging devices 52_1 and 52_2 on dual monitors or may display videos imaged by the respective imaging devices 52_1 and 52_2 on a common monitor.

In addition, the display device 53_1 has a function of measuring the reception status of the video data from the imaging device 52_1 and the reception status of the video data from the imaging device 52_2 and feeding back the measurement results to the imaging devices 52_1 and 52_2, respectively.

The communication control device 51 is also referred to as an adaptive network (NW) control device and is installed in, for example, a management center C. The communication control device 51 controls transmission conditions of the video data transmitted from the respective imaging devices 52_1 and 52_2 to the display device 53_1 based on the video quality information I1 and I2 from the respective imaging devices 52_1 and 52_2. The transmission conditions of the video data transmitted from the respective imaging devices 52_1 and 52_2 to the display device 53_1 are, for example, parameters such as bit rates, frame rates, and resolutions of the video data set in the respective imaging devices.

Here, the communication control device 51 does not relay (deliver) the video data transmitted from the respective imaging devices 52_1 and 52_2 to the display device 53_1. As a result, the burden on the communication control device 51 is reduced.

(Flow of Processing of Communication Control System 5)

Next, a flow of processing of the communication control system 5 is described with reference to FIGS. 14 and 15.

Figure 14:
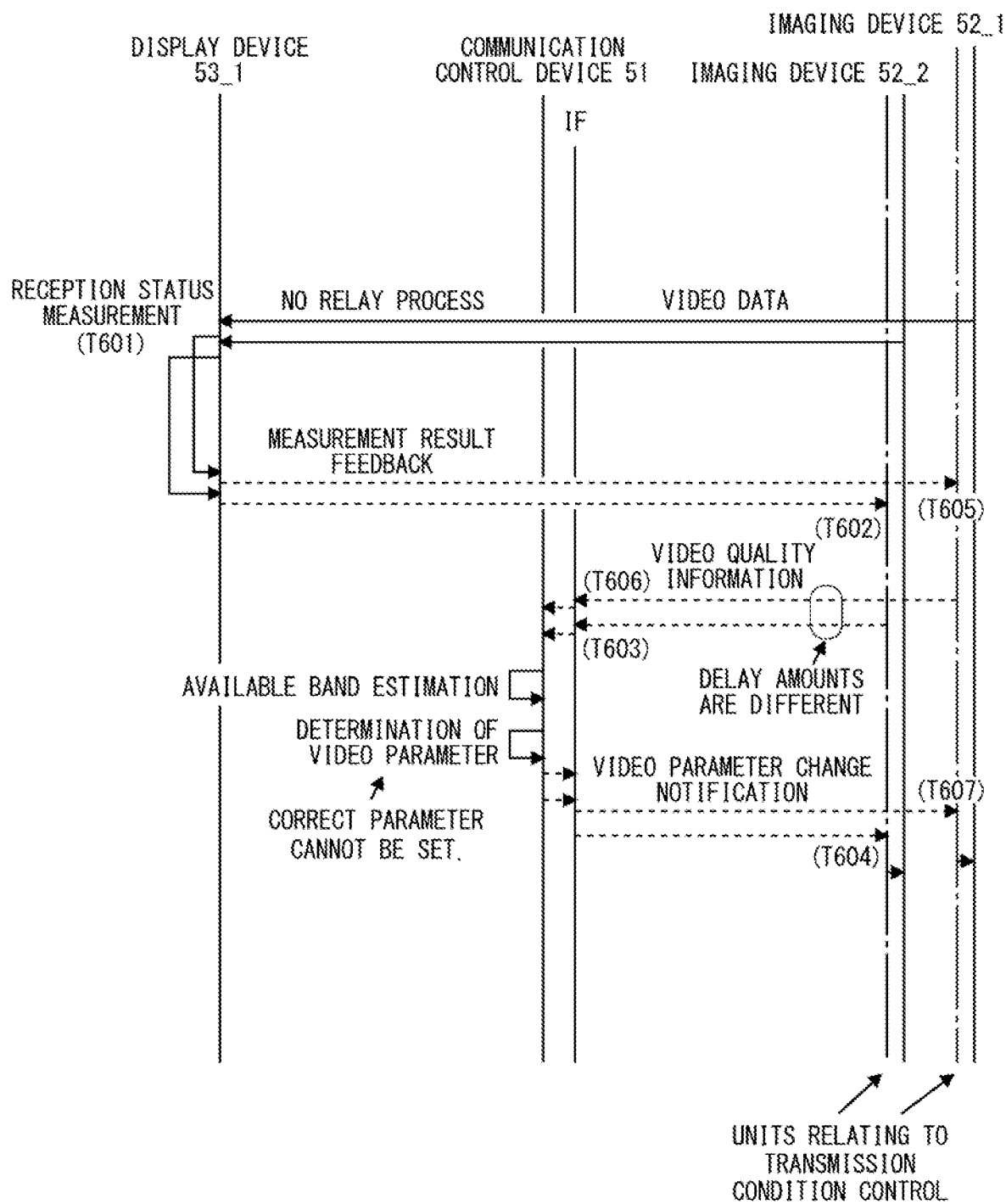
FIG. 14 is a diagram illustrating a flow of processing of the communication control system illustrated in FIG. 13.
Figure 15:
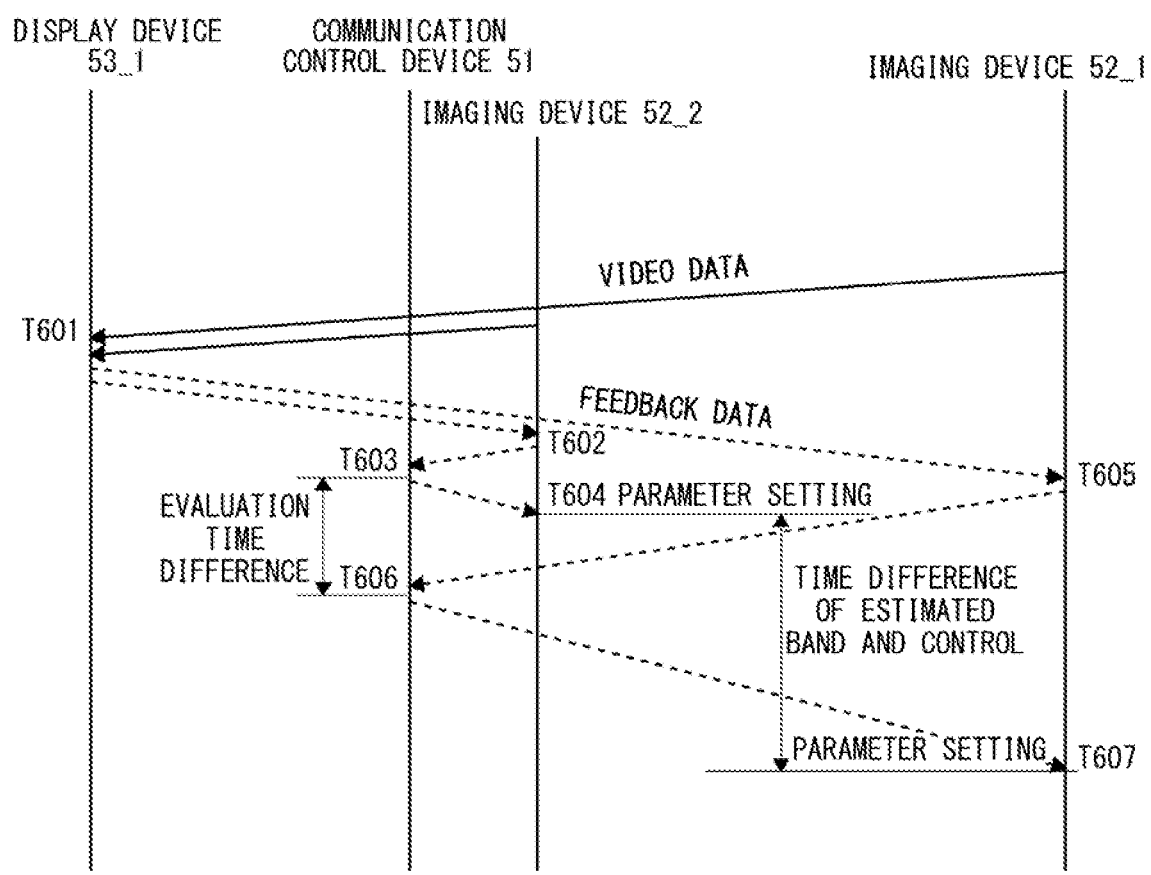
FIG. 15 is a diagram illustrating details of the flow of the processing of the communication control system illustrated in FIG. 13.

FIG. 14 is a diagram illustrating the flow of the processing of the communication control system 5. FIG. 15 is a diagram illustrating details of the flow of the processing of the communication control system 5.

First, the imaging device 52_1 transmits video data, which is a video obtained by imaging a peripheral region of the predetermined position A1, to the display device 53_1 via the network 50. In addition, the imaging device 52_2 transmits video data, which is a video obtained by imaging a peripheral region of the predetermined position A2, to the display device 53_1 via the network 50.

Upon receiving the video data transmitted from the respective imaging devices 52_1 and 52_2, the display device 53_1 displays the videos of the video data on the monitor (time T601).

At this point, the display device 53_1 measures the reception statuses (for example, the number of packets) of the respective items of video data (time T601). Then, the display device 53_1 transmits (feeds back) the measurement results of the reception statuses of the respective items of video data to the imaging device corresponding to the respective items of video data via the network 50.

The imaging device 52_2 receives the measurement result of the reception status of the video data on the display device 53_1 fed back from the display device 53_1 via the network 50 (time T602). Then, the imaging device 52_2 transmits information including the transmission status of the video data transmitted to the display device 53_1 and the reception status (measurement result) of the video data on the display device 53_1 or a difference therebetween to the communication control device 51 as the video quality information I2. The video quality information I2 may be information including an estimated value of an available band calculated in the imaging device 52_2 instead of the above information. In addition, the video quality information I2 includes identification information of the imaging device and the like in addition to the above information.

The imaging device 52_1 receives the measurement result of the reception status of the video data on the display device 53_1 fed back from the display device 53_1 via the network 50 (time T605). Then, the imaging device 52_1 transmits information including the transmission status of the video data transmitted to the display device 53_1 and the reception status (measurement result) of the video data on the display device 53_1 or a difference therebetween to the communication control device 51 as the video quality information I1. The video quality information I1 may be information including an estimated value of an available band calculated in the imaging device 52_1 instead of the above information. In addition, the video quality information I1 includes identification information of the imaging device and the like in addition to the above information.

When the video quality information I2 transmitted from the imaging device 52_2 is received, the communication control device 51 estimates an available communication band of the video data transmitted from the imaging device 52_2 to the display device 53_1 based on the corresponding video quality information I2 (time T603). In addition, when the video quality information I1 transmitted from the imaging device 52_1 is received, the communication control device 51 estimates an available communication band of the video data transmitted from the imaging device 52_1 to the display device 53_1 based on the corresponding video quality information I1 (time T606).

Thereafter, the communication control device 51 determines transmission conditions of the respective items of video data based on the estimated values of the available communication bands of the respective items of video data and imaging priorities of the respective imaging devices. Then, the communication control device 51 instructs the respective imaging devices 52_1 and 52_2 to change the transmission conditions of the video data to the transmission conditions determined by the communication control device 51. In other words, the communication control device 51 instructs the respective imaging devices 52_1 and 52_2 to change the parameters relating to the transmission of the videos to parameters determined by the communication control device 51. As a result, parameters of the transmission conditions determined by the communication control device 51 are set in the imaging devices 52_1 and 52_2, respectively (times T607 and T604).

In addition, since it is required to generate video data with high image qualities as the imaging priority is higher, a bit rate, a frame rate, a resolution, and the like are maintained as high as possible as the imaging priority is higher. In contrast, since it is allowed to generate video data with low image qualities as the imaging priority is lower, a bit rate, a frame rate, a resolution, and the like are adjusted to be lower as the imaging priority is lower.

As described above, in the communication control system 5, the communication control device 51 controls the transmission conditions of the video data transmitted from the respective imaging devices to the display device with reference to the reception status of the video data on the display device 53_1 fed back from the display device 53_1. Thereby, the communication control device 51 can accurately control the transmission conditions of the video data transmitted from the respective imaging devices to the display device. Furthermore, real-time transmission of the imaged video can be implemented.

Furthermore, in the communication control system 5, the communication control device 51 does not relay (deliver) the video data transmitted from the respective imaging devices 52_1 and 52_2 to the display device 53_1. As a result, the burden on the communication control device 51 is reduced.

Here, in the present example, the distance between the imaging device 52_1 and the communication control device 51 is longer than the distance between the imaging device 52_2 and the communication control device 51. Therefore, the time (time T606) at which the communication control device 51 receives the video quality information I1 from the imaging device 52_1 is later than the time (time T603) at which the communication control device 51 receives the video quality information I2 from the imaging device 52_2. Therefore, the time (time T606) at which the available communication band of the video data transmitted from the imaging device 52_1 to the display device 53_1 is estimated is later than the time (time T603) at which the available communication band of the video data transmitted from the imaging device 52_2 to the display device 53_1 is estimated. Accordingly, the update time (time T607) of the transmission condition of the imaging device 52_1 becomes later than the update time (time T604) of the transmission condition of the imaging device 52_2. That is, there is a time difference between the update time of the transmission condition of the imaging device 52_1 and the update time (time T604) of the transmission condition of the imaging device 52_2.

Figure 16:
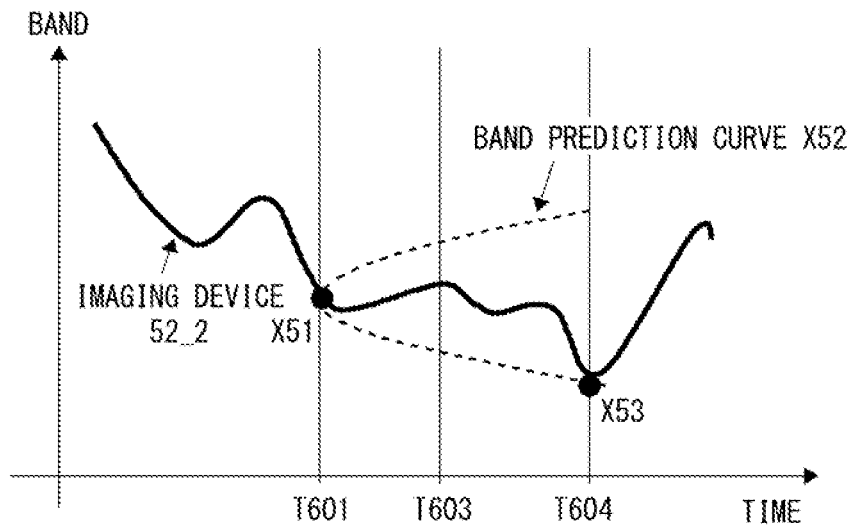
FIG. 16 is a diagram illustrating a method for determining transmission conditions of video data transmitted from respective imaging devices to a display device in the communication control system illustrated in FIG. 13.
Figure 17:
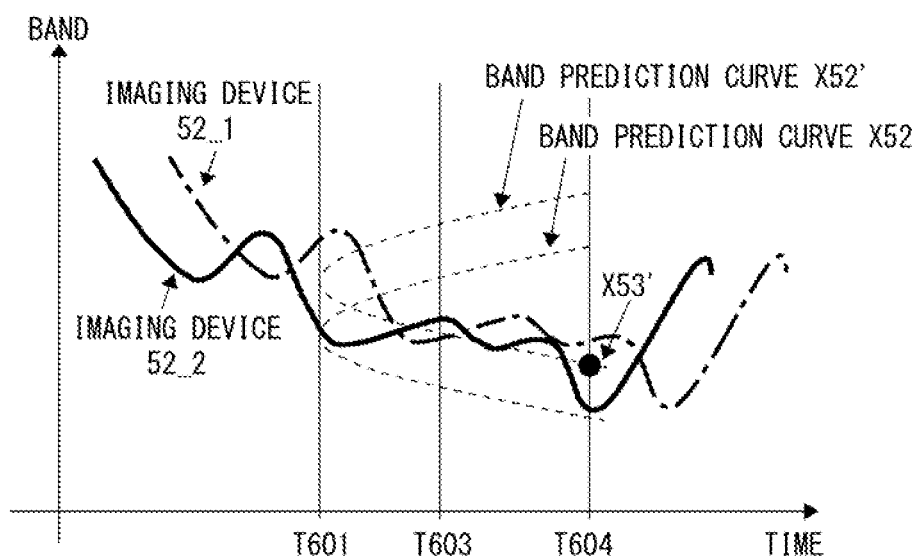
FIG. 17 is a diagram illustrating the method for determining transmission conditions of the video data transmitted from the respective imaging devices to the display device in the communication control system illustrated in FIG. 13.

FIGS. 16 and 17 are diagrams illustrating a method for determining the transmission conditions of the video data transmitted from the respective imaging devices to the display device in the communication control system 5.

As illustrated in FIG. 16, first, an available communication band X51 at the time T601 of the video data transmitted from the imaging device 52_2 to the display device 53_1 is estimated. The available communication band after the time T601 is predicted with the available communication band (estimated value) X51 at the time T601 as a base point (a band prediction curve X52 in the drawing). In the band prediction curve X52, a minimum value X53 at the time T604, which is the update time of the transmission condition set in the imaging device 52_2, is employed as the communication band (one of the transmission conditions) of the video data by the imaging device 52_2.

Actually, as illustrated in FIG. 17, at the time T601, not only the video data is transmitted from the imaging device 52_2 to the display device 53_1, but also the video data is transmitted from the imaging device 52_1 to the display device 53_1. Therefore, when the estimation results of the two available communication bands are mixed in the communication control device 51, a band prediction curve X52' different from the band prediction curve X52 is likely to be formed. In this case, in the band prediction curve X52', a minimum value X53' at the time T604, which is the update time of the transmission condition set in the imaging device 52_2, is employed as the communication band of the video data by the imaging device 52_2.

Next, a communication control system according to a first example embodiment will be described. The communication control system 1 according to the first example embodiment can control the communication conditions of the video data more accurately than the case of the communication control system 5.

First Example Embodiment

FIG. 1 is a block diagram illustrating a configuration example of the communication control system 1 according to the first example embodiment.

As illustrated in FIG. 1, the communication control system 1 includes a communication control device 11, a plurality of imaging devices 12_1 to 12_N (N is an integer of 2 or more), a display device 13_1, and a network 40. In the present example embodiment, a case where two imaging devices 12_1 and 12_2 are provided is described as an example. The imaging devices 12_1 and 12_2, the display device 13_1, and the communication control device 11 are connected to each other via the network 40.

(Imaging Devices 12_1 and 12_2)

The imaging device 12_1 is a so-called camera and is installed, for example, at a predetermined position A1. The imaging device 12_2 is a so-called camera and is installed, for example, at a predetermined position A2. Imaging priorities are set to the respective imaging devices 12_1 and 12_2. As the imaging priority is higher, it is required to generate video data with higher image qualities, and as the imaging priority is lower, it is allowed to generate video data with lower image qualities. Furthermore, in the present example embodiment, a case where the imaging device 12_1 is installed at a position farther from the relay point of the network 40 than the imaging device 12_2 is described as an example. Therefore, in the present example embodiment, a distance (communication time) between the imaging device 12_1 and the communication control device 11 is longer than a distance (communication time) between the imaging device 12_2 and the communication control device 11.

In addition, the imaging device 12_1 has a function of detecting video quality information I1 of the video data based on a transmission status of the video data transmitted to the display device 13_1 and a reception status of the video data on the display device 13_1 fed back from the display device 13_1. The video quality information I1 is, for example, a difference between the number of packets of the video data transmitted from the imaging device 12_1 to the display device 13_1 and the number of packets of the video data received by the display device 13_1.

In the same manner, the imaging device 12_2 has a function of detecting video quality information I2 of the video data based on the transmission status of the video data transmitted to the display device 13_1 and the reception status of the video data on the display device 13_1 fed back from the display device 13_1. The video quality information I2 is, for example, a difference between the number of packets of the video data transmitted from the imaging device 12_2 to the display device 13_1 and the number of packets of the video data received by the display device 13_1.

(Specific Configuration Example of Imaging Device 12_1)

Figure 2:
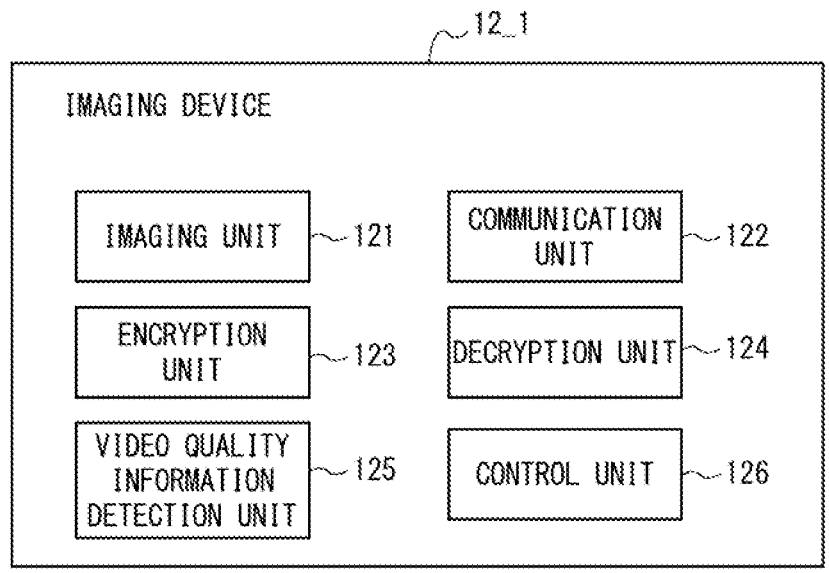
FIG. 2 is a block diagram illustrating a specific configuration example of an imaging device provided in the communication control system illustrated in FIG. 1.

FIG. 2 is a block diagram illustrating a specific configuration example of the imaging device 12_1. Since a configuration of the imaging device 12_2 is basically the same as the configuration of the imaging device 12_1 except that the video quality information I1 is replaced with the video quality information I2, the description thereof is omitted.

As illustrated in FIG. 2, the imaging device 12_1 includes at least an imaging unit 121, a communication unit 122, an encryption unit 123, a decryption unit 124, a video quality information detection unit 125, and a control unit 126.

The imaging unit 121 images a periphery of the predetermined position A1.

The encryption unit 123 encrypts video data that is a video imaged by the imaging unit 121.

The communication unit 122 communicates with the network 40. As a result, the imaging device 12_1 equipped with the communication unit 122 can communicate with other devices (such as the display device 13_1, the communication control device 11) connected to the network 40.

For example, the communication unit 122 transmits the video data encrypted by the encryption unit 123 to the display device 13_1 via the network 40 and receives the feedback data transmitted from the display device 13_1 via the network 40. Furthermore, the communication unit 122 transmits the video quality information I1 to the communication control device 11 and receives an instruction to change the transmission condition of the video data transmitted from the communication control device 11.

The decryption unit 124 decrypts the encrypted data. For example, the decryption unit 124 decrypts the encrypted data fed back from the display device 13_1 (the encrypted data related to the reception status of the video data in the display device 13_1).

The video quality information detection unit 125 has a function of detecting the video quality information I1 of the video data based on the transmission status of the video data transmitted from the imaging device 12_1 to the display device 13_1 and the reception status of the video data on the display device 13_1 fed back from the display device 13_1. The video quality information I1 is, for example, a difference between the number of packets of the video data transmitted from the imaging device 12_1 to the display device 13_1 and the number of packets of the video data received by the display device 13_1.

The control unit 126 generally controls each block provided in the imaging device 12_1.

(Display Device 13_1)

The display device 13_1 includes a monitor that displays videos imaged by the respective imaging devices 12_1 and 12_2 and is mounted on, for example, the vehicle B1. The display device 13_1 may display videos imaged by the respective imaging devices 12_1 and 12_2 on dual monitors or may display videos imaged by the respective imaging devices 12_1 and 12_2 on a common monitor.

In addition, the display device 13_1 has a function of measuring the reception status of the video data from the imaging device 12_1 and the reception status of the video data from the imaging device 12_2 and feeding back the measurement results to the imaging devices 12_1 and 12_2, respectively.

(Specific Configuration Example of Display Device 13_1)

Figure 3:
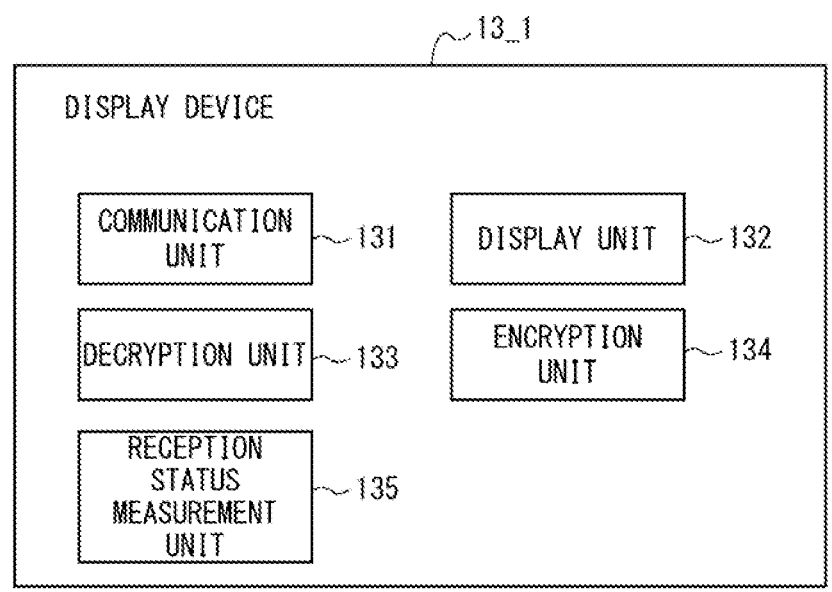
FIG. 3 is a block diagram illustrating a specific configuration example of a display device provided in the communication control system illustrated in FIG. 1.

FIG. 3 is a block diagram illustrating a specific configuration example of the display device 13_1.

As illustrated in FIG. 3, the display device 13_1 at least includes a communication unit 131, a display unit 132, a decryption unit 133, an encryption unit 134, and a reception status measurement unit 135.

The communication unit 131 communicates with the network 40. As a result, the display device 13_1 equipped with the communication unit 131 can communicate with other devices (such as the imaging devices 12_1 and 12_2 and the communication control device 11) connected to the network 40.

For example, the communication unit 131 receives the video data transmitted from the respective imaging devices 12_1 and 12_2 via the network and transmits (feeds back) the measurement results of the reception statuses of the respective items of video data to the imaging devices corresponding to the respective items of video data via the network 40. Therefore, the communication unit 131 can also be referred to as a feedback transmission unit.

The decryption unit 133 decrypts the encrypted data. For example, the decryption unit 133 decrypts the encrypted video data from the respective imaging devices 12_1 and 12_2.

The display unit 132 is a so-called monitor and displays videos of respective items of video data decrypted by the decryption unit 133. The reception status measurement unit 135 measures the reception statuses of the respective items of video data decrypted by the decryption unit 133. The encryption unit 134 encrypts the measurement result by the reception status measurement unit 135.

The measurement results of the reception statuses of respective items of video data encrypted by the encryption unit 134 are transmitted as feedback data by the communication unit 131 to the imaging devices corresponding to the respective items of video data via the network 40.

(Communication Control Device 11)

The communication control device 11 is also referred to as an adaptive network (NW) control device and is installed in, for example, the management center C. The communication control device 11 controls transmission conditions of the video data transmitted from the respective imaging devices 12_1 and 12_2 to the display device 13_1 based on the video quality information I1 and I2 from the respective imaging devices 12_1 and 12_2. The transmission conditions of the video data transmitted from the respective imaging devices 12_1 and 12_2 to the display device 13_1 are, for example, parameters such as bit rates, frame rates, and resolutions of the video data set in the respective imaging devices.

Here, the communication control device 11 does not relay (deliver) the video data transmitted from the respective imaging devices 12_1 and 12_2 to the display device 13_1. As a result, the burden on the communication control device 11 is reduced.

(Specific Configuration Example of Communication Control Device 11)

Figure 4:
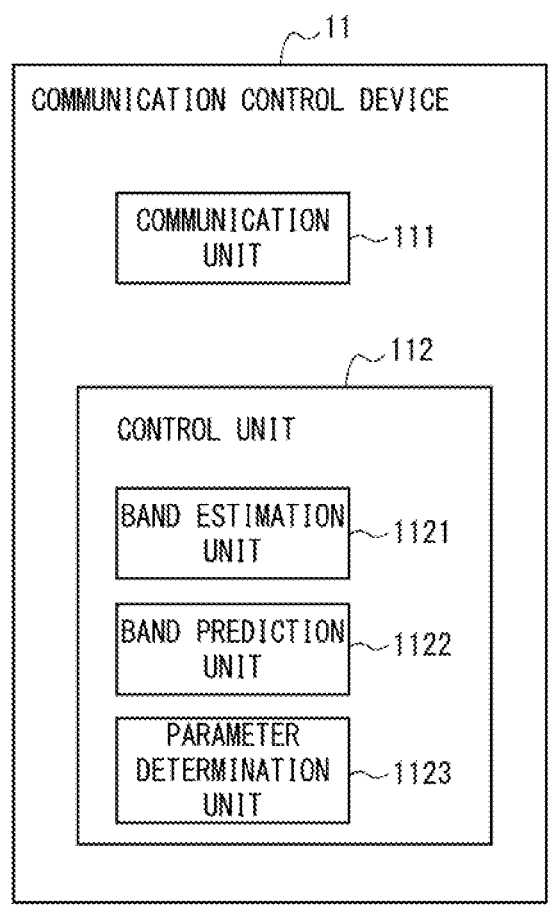
FIG. 4 is a block diagram illustrating a specific configuration example of a communication control device provided in the communication control system illustrated in FIG. 1.

FIG. 4 is a block diagram illustrating a specific configuration example of the communication control device 11.

As illustrated in FIG. 4, the communication control device 11 includes at least a communication unit 111 and a control unit 112.

The communication unit 111 communicates with the network 40. As a result, the communication control device 11 equipped with the communication unit 131 can communicate with other devices (such as the imaging devices 12_1 and 12_2 and the display device 13_1) connected to the network 40.

For example, the communication unit 111 receives (acquires) the video quality information I1 and I2 transmitted from the respective imaging devices 12_1 and 12_2 and transmits instructions to change the transmission conditions of the video data to the respective imaging devices 12_1 and 12_2. The communication unit 111 can also be referred to as an acquisition unit that acquires the video quality information I1 and I2.

The control unit 112 controls the transmission conditions of the video data transmitted from the respective imaging devices 12_1 and 12_2 to the display device 13_1 based on the acquired video quality information I1 and I2.

Specifically, the control unit 112 includes a band estimation unit 1121, a band prediction unit 1122, and a parameter determination unit 1123.

The band estimation unit 1121 estimates an available communication band of the video data corresponding to the video quality information acquired earlier from the corresponding video quality information acquired earlier among the video quality information I1 and I2. The band prediction unit 1122 calculates a band prediction curve of the video data corresponding to the video quality information acquired later among the video quality information I1 and I2 based on a reception time difference between the video quality information I1 and I2.

Here, in the present example embodiment, the distance between the imaging device 12_1 and the communication control device 11 is longer than the distance between the imaging device 12_2 and the communication control device 11. Therefore, an acquisition time of the video quality information I1 by the communication control device 11 is later than an acquisition time of the video quality information I2 by the communication control device 11.

Therefore, the band estimation unit 1121 estimates an available communication band of the video data (that is, the video data transmitted from the imaging device 12_2 to the display device 13_1) corresponding to the video quality information I2 from the corresponding video quality information I2 acquired earlier among the video quality information I1 and I2. In addition, the band prediction unit 1122 calculates the band prediction curve of the video data (that is, the video data transmitted from the imaging device 12_1 to the display device 13_1) corresponding to the video quality information I1 acquired later among the video quality information I1 and I2 based on the reception time difference between the video quality information I1 and I2. Specifically, the band prediction unit 1122 calculates a band prediction curve for the imaging device 12_1 with time before the reception time difference between the video quality information I1 and I2 from the time when the display device 13_1 receives the video data instead of the imaging devices 12_1 and 12_2 as a base point. In practice, the band prediction unit 1122 calculates a band prediction curve with the estimated value of the available communication band estimated by the band estimation unit 1121 as a base point and then shifts the calculated band prediction curve to the time before the reception time difference between the video quality information I1 and I2. At this time, the band prediction curve is shifted so as to pass through the estimated value of the available communication band estimated by the band estimation unit 1121.

Furthermore, the band prediction unit 1122 calculates a band prediction curve (entire band prediction curve) common to the imaging devices 12_1 and 12_2 based on the available communication band estimated by the band estimation unit 1121 and the band prediction curve calculated by the band prediction unit 1122. That is, the band prediction unit 1122 calculates the band prediction curve (entire band prediction curve) common to the imaging devices 12_1 and 12_2 based on the available communication band of the video data transmitted from the imaging device 12_2 to the display device 13_1 and the band prediction curve of the video data transmitted from the imaging device 12_1 to the display device 13_1.

The parameter determination unit 1123 determines respective transmission conditions of the video data transmitted from the imaging devices 12_1 and 12_2 to the display device 13_1 by using the band prediction curve (entire band prediction curve) common to the imaging devices 12_1 and 12_2.

(Flow of Processing of Communication Control System 1)

Next, a flow of processing of the communication control system 1 is described with reference to FIGS. 5 and 6.

Figure 5:
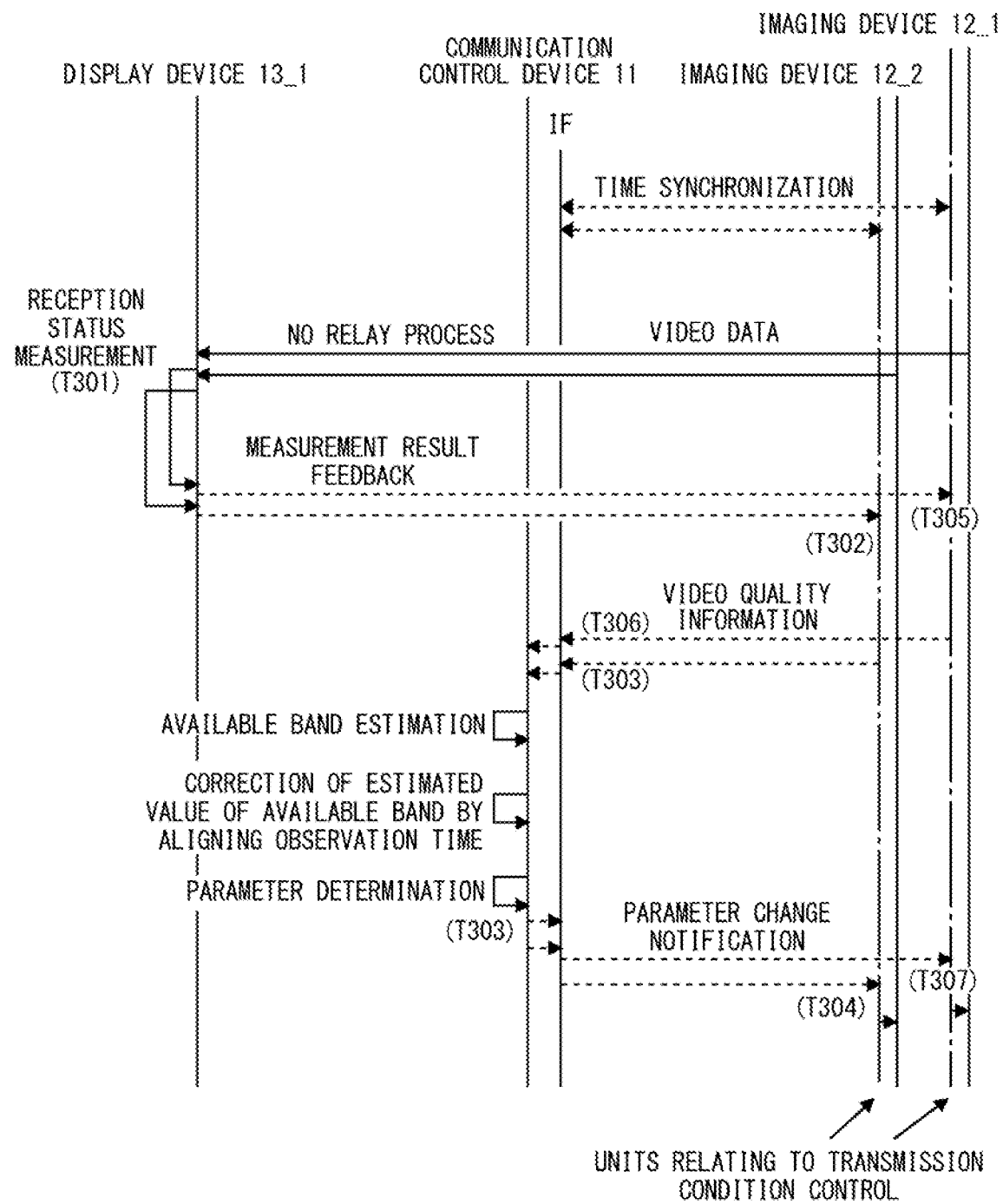
FIG. 5 is a diagram illustrating a flow of processing of the communication control system illustrated in FIG. 1.
Figure 6:
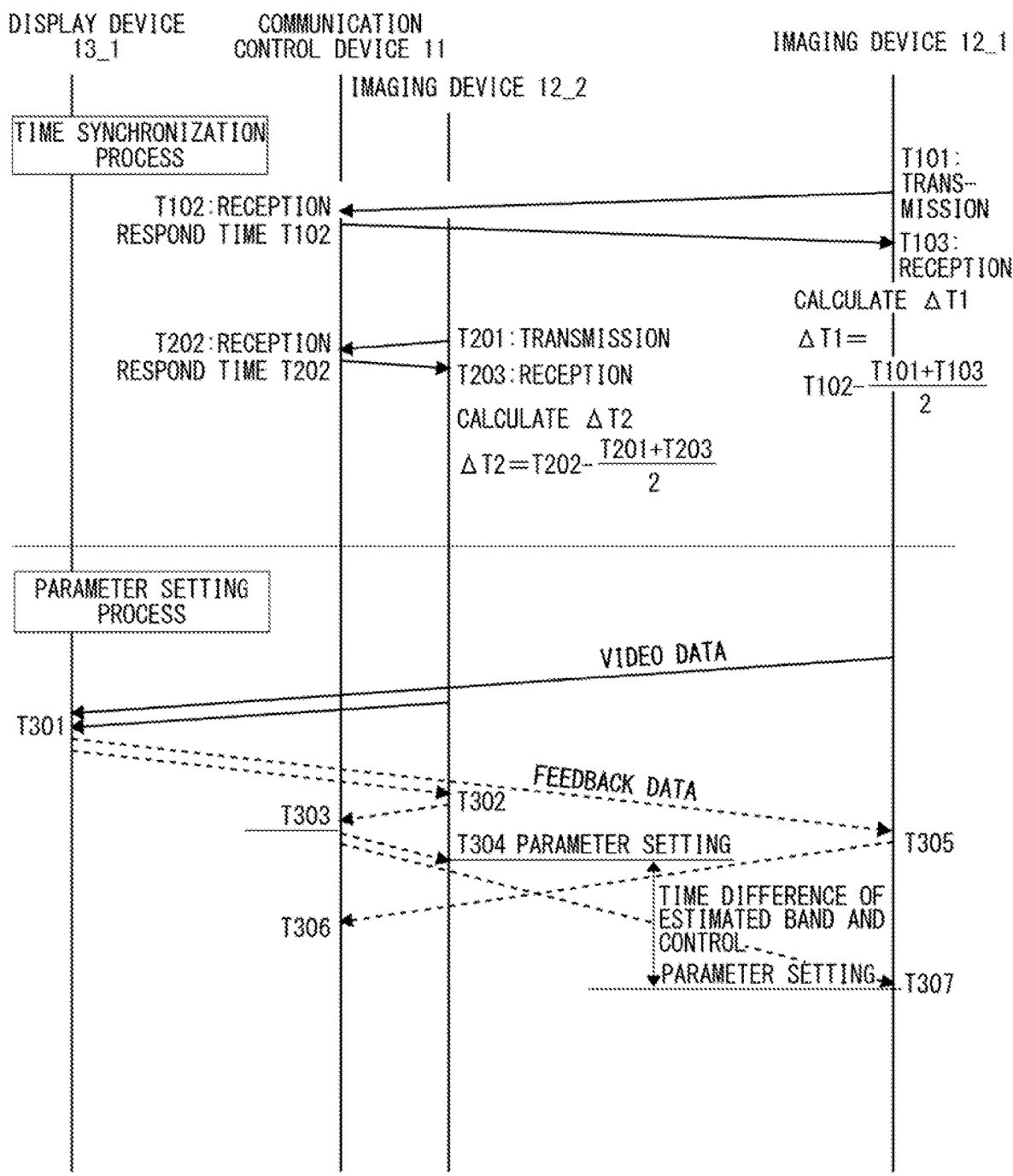
FIG. 6 is a diagram illustrating details of the flow of the processing of the communication control system illustrated in FIG. 1.

FIG. 5 is a diagram illustrating the flow of the processing of the communication control system 1. FIG. 6 is a diagram illustrating details of the flow of the processing of the communication control system 1.

In the present example embodiment, the distance between the imaging device 12_1 and the communication control device 11 is longer than the distance between the imaging device 12_2 and the communication control device 11. Therefore, an acquisition time of the video quality information I1 by the communication control device 11 is later than an acquisition time of the video quality information I2 by the communication control device 11.

Furthermore, in the present example embodiment, the transmission data is encrypted and the reception data is decrypted in the respective imaging devices 12_1 and 12_2 and the display device 13_1, but this is omitted in the following description.

First, time synchronization is performed between the communication control device 11 and the respective imaging devices 12_1 and 12_2.

For example, the imaging device 12_1 transmits dummy data to the communication control device 11 and records transmission time T101. Upon receiving the dummy data, the communication control device 11 returns information on reception time T102 to the imaging device 12_1. Upon receiving the reply from the communication control device 11, the imaging device 12_1 records reception time T103. Then, the imaging device 12_1 calculates a time difference ΔT1 as in Equation (1) using the information on the times T101, T102, and T103.

$$\Delta T1 = T102 - (T101 + T103)/2 \qquad (1)$$

The time of the imaging device 12_1 is corrected by adding the time difference ΔT1 to the time of the imaging device 12_1.

In the same manner, the imaging device 12_2 transmits dummy data to the communication control device 11 and records transmission time T201. Upon receiving the dummy data, the communication control device 11 returns information on reception time T202 to the imaging device 12_2. Upon receiving the reply from the communication control device 11, the imaging device 12_2 records reception time T203. Then, the imaging device 12_2 calculates a time difference ΔT2 as in Equation (2) using the information on the times T201, T202, and T203.

$$\Delta T2 = T202 - (T201 + T203)/2 \qquad (2)$$

The time of the imaging device 12_2 is corrected by adding the time difference ΔT2 to the time of the imaging device 12_2.

In this manner, time synchronization is performed between the communication control device 11 and the respective imaging devices 12_1 and 12_2. The method of time synchronization is not limited to the method described above. For example, instead of correcting the times of the respective imaging devices 12_1 and 12_2 in advance, the time may be calculated by subtracting the time differences ΔT1 and ΔT2, respectively, each time the imaging devices 12_1 and 12_2 transmit video data. Alternatively, the communication control device 11 and the respective imaging devices 12_1 and 12_2 may be time-synchronized by a global time server.

After the time synchronization, the imaging device 12_1 transmits video data, which is a video obtained by imaging a peripheral region of the predetermined position A1, to the display device 13_1 via the network 40. In addition, the imaging device 12_2 transmits video data, which is a video obtained by imaging a peripheral region of the predetermined position A2, to the display device 13_1 via the network 40.

Upon receiving the video data transmitted from the respective imaging devices 12_1 and 12_2, the display device 13_1 displays the videos of the video data on the monitor (time T301).

At this point, the display device 13_1 measures the reception statuses (for example, the number of packets) of the respective items of video data (the time T301). Then, the display device 13_1 transmits (feeds back) the measurement results of the reception statuses of the respective items of video data to the imaging device corresponding to the respective items of video data via the network 40.

The imaging device 12_2 receives the measurement result of the reception status of the video data on the display device 13_1 fed back from the display device 13_1 via the network 40 (time T302). Then, the imaging device 12_2 transmits information including the transmission status of the video data transmitted to the display device 13_1 and the reception status (measurement result) of the video data on the display device 13_1 or a difference therebetween to the communication control device 11 as the video quality information I2. The video quality information I2 may be information including an estimated value of an available band calculated in the imaging device 12_2 instead of the above information. In addition, the video quality information I2 includes identification information of the imaging device and the like in addition to the above information.

The imaging device 12_1 receives the measurement result of the reception status of the video data on the display device 13_1 fed back from the display device 13_1 via the network 40 (time T305). Then, the imaging device 12_1 transmits information including the transmission status of the video data transmitted to the display device 13_1 and the reception status (measurement result) of the video data on the display device 13_1 or a difference therebetween to the communication control device 11 as the video quality information I1.

The video quality information I1 may be information including an estimated value of an available band calculated in the imaging device 12_1 instead of the above information. In addition, the video quality information I1 includes identification information of the imaging device and the like in addition to the above information.

Upon receiving the video quality information I2 from the imaging device 12_2 earlier than the video quality information I1, the communication control device 11 estimates an available communication band of the video data transmitted from the imaging device 12_2 to the display device 13_1 at the time T301 based on the corresponding video quality information I2 (time T303).

At this time, the communication control device 11 calculates the band prediction curve of the video data transmitted from the imaging device 12_1 to the display device 13_1 based on the reception time difference (T306-T303) between the video quality information I1 and I2 (time T303). Specifically, the communication control device 11 calculates the band prediction curve for the imaging device 12_1 with time before the reception time difference (T306-T303) between the video quality information I1 and I2 instead of the time T301 when the display device 13_1 receives the video data from the imaging devices 12_1 and 12_2 as a base point. The information on the reception time difference between the video quality information I1 and I2 is assumed to be acquired in advance from notification time in the past or the like.

Further, the communication control device 11 calculates the band prediction curve common to the imaging devices 12_1 and 12_2 based on the available communication band of the video data transmitted from the imaging device 12_2 to the display device 13_1 and the band prediction curve of the video data transmitted from the imaging device 12_1 to the display device 13_1 (time T303).

Also, the communication control device 11 determines the respective transmission conditions of the video data transmitted from the imaging devices 12_1 and 12_2 to the display device 13_1 based on the band prediction curve at least common to the imaging devices 12_1 and 12_2 (time T303). In the present example, the communication control device 11 determines the respective transmission conditions of the video data transmitted from the imaging devices 12_1 and 12_2 to the display device 13_1 based on the imaging priorities of the imaging devices 12_1 and 12_2 in addition to the band prediction curve common to the imaging devices 12_1 and 12_2.

In addition, since it is required to generate video data with high image qualities as the imaging priority is higher, a bit rate, a frame rate, a resolution, and the like are maintained as high as possible as the imaging priority is higher. In contrast, since it is allowed to generate video data with low image qualities as the imaging priority is lower, a bit rate, a frame rate, a resolution, and the like are adjusted to be lower as the imaging priority is lower.

Then, the communication control device 11 instructs the respective imaging devices 12_1 and 12_2 to change the transmission conditions of the video data to the transmission conditions determined by the communication control device 11. In other words, the communication control device 11 instructs the respective imaging devices 12_1 and 12_2 to change the parameters relating to the transmission of the videos to parameters determined by the communication control device 11. As a result, parameters of the transmission conditions determined by the communication control device 11 are set in the imaging devices 12_1 and 12_2, respectively (times T307 and T304).

Figure 7:
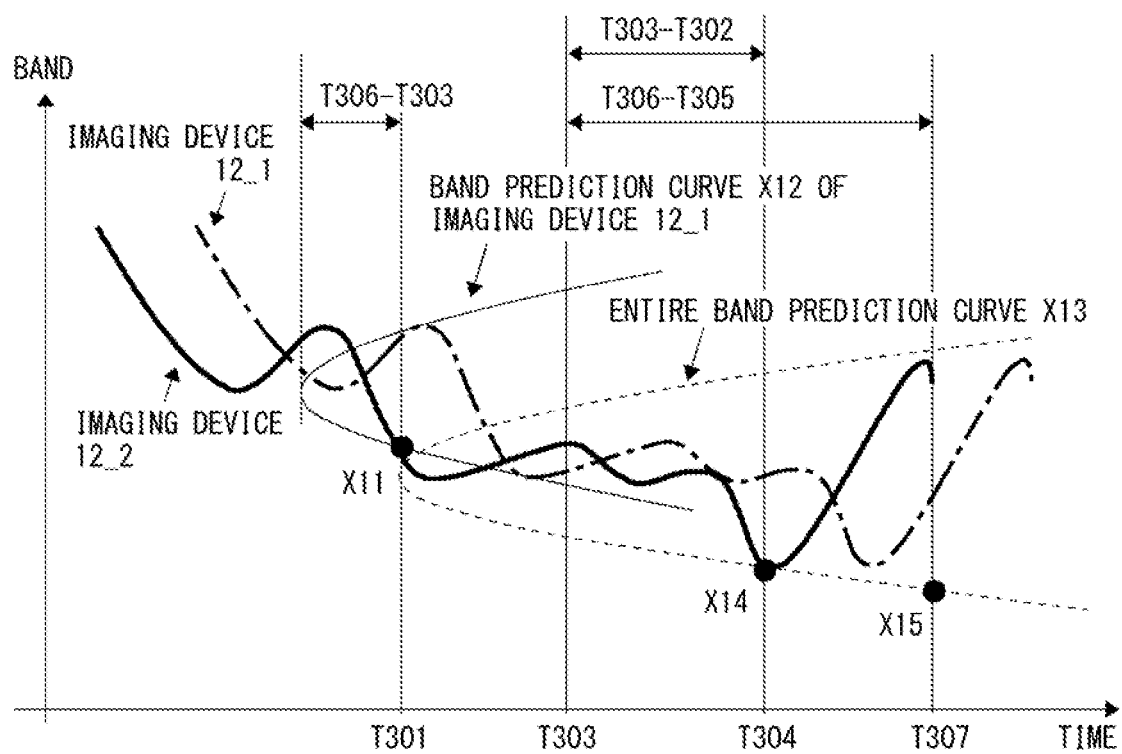
FIG. 7 is a diagram illustrating a method for determining transmission conditions of video data transmitted from the respective imaging devices to the display device in the communication control system illustrated in FIG. 1.

FIG. 7 is a diagram illustrating a method for determining transmission conditions of video data transmitted from the respective imaging devices to the display device in the communication control system 1.

As illustrated in FIG. 7, first, an available communication band X11 at the time T301 of the video data transmitted from the imaging device 12_2 to the display device 13_1 is estimated. Further, a band prediction curve X12 of the video data transmitted from the imaging device 12_1 to the display device 13_1 is calculated with the time obtained by subtracting the reception time difference (T306-T303) between the video quality information I1 and I2 from the time T301 as a base point. Thereafter, a band prediction curve X13 common to the imaging devices 12_1 and 12_2 is calculated based on the available communication band X11 and the band prediction curve X12 of the imaging device 12_1. In the band prediction curve X13, a minimum value X14 at the time T304, which is the update time of the transmission condition set in the imaging device 12_2, is employed as the communication band of the video data by the imaging device 12_2. Further, in the band prediction curve X13, a minimum value X15 at the time T307, which is the update time of the transmission condition set in the imaging device 12_1, is employed as the communication band of the video data by the imaging device 12_1. The communication bands X14 and X15 do not exceed the available communication band.

As described above, the communication control device 11 can determine the transmission condition of the imaging device 12_1 simultaneously with the determination of the transmission condition of the imaging device 12_2 without waiting for reception of the video quality information I1 from the imaging device 12_1. As a result, the communication control device 11 can reduce a difference between the update times of the transmission conditions of the respective imaging devices 12_1 and 12_2 and thus can accurately set the transmission conditions for the respective imaging devices 12_1 and 12_2.

Furthermore, the communication control device 11 calculates a band prediction curve for the imaging device 12_1 in consideration of the reception time difference between the video quality information I1 and I2 and calculates a band prediction curve common to the imaging devices 12_1 and 12_2 using the calculation result. Accordingly, since the mixture of the estimation results of the plurality of available communication bands does not occur when the transmission conditions of the respective imaging devices 12_1 and 12_2 are set, the communication control device 11 can accurately set the transmission conditions for the respective imaging devices 12_1 and 12_2.

In the present example embodiment, the case where the imaging device 12_1 is installed at the predetermined position A1 and the imaging device 12_2 is installed at the predetermined position A2 is described as an example, but the present invention is not limited thereto. The imaging devices 12_1 and 12_2 may be mounted on a common vehicle or different vehicles.

(First Application Case of Communication Control System 1)

Next, a first application case of the communication control system 1 is described with reference to FIGS. 8 and 9.

Figure 8:
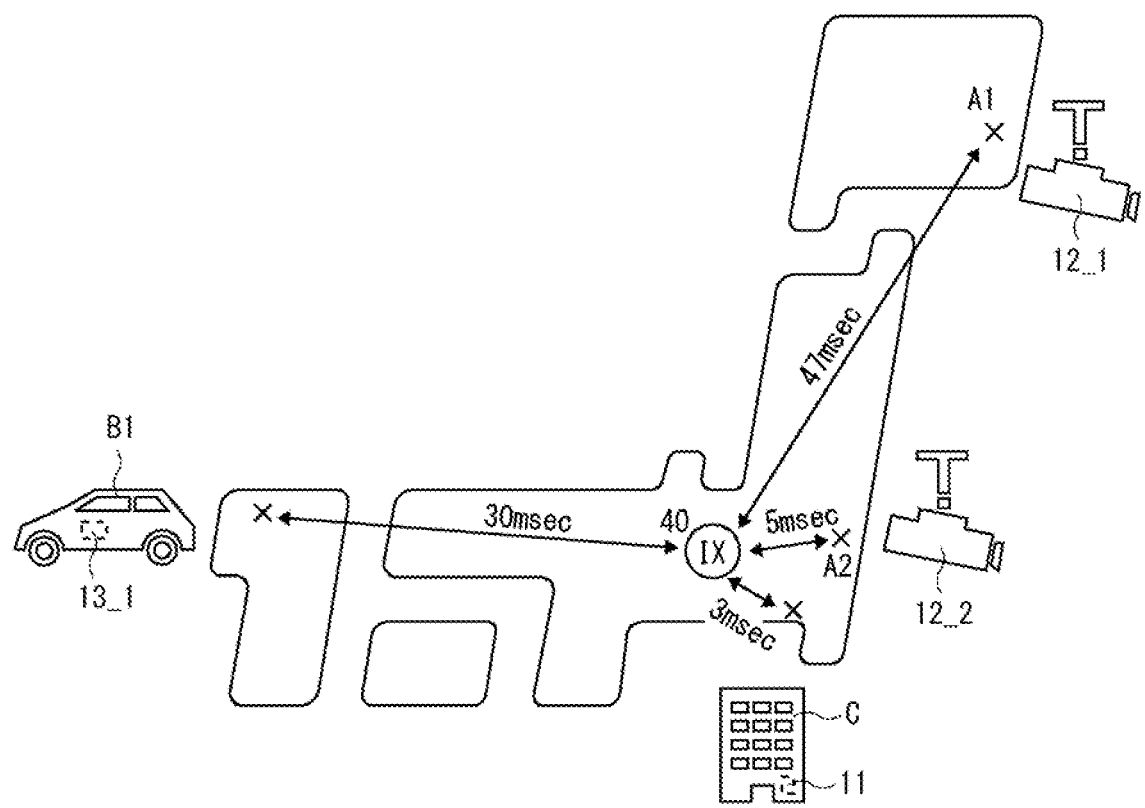
FIG. 8 is a diagram illustrating a first application case of the communication control system illustrated in FIG. 1.

FIG. 8 is a diagram illustrating the first application case of the communication control system 1. FIG. 9 is a diagram illustrating an effect of the first application case of the communication control system 1.

In the example of FIG. 8, the communication control system 1 is applied in Japan. In the present example, the communication time between a relay point IX (Internet eXchange) of the network 40 and the imaging device 12_1 is 47 milliseconds (msec) one way. The communication time between the relay point IX and the imaging device 12_2 is 5 msec one way. The communication time between the relay point IX and the vehicle B1 equipped with the display device 13_1 is 30 msec one way. In addition, the communication time between the relay point IX and the management center C where the communication control device 11 is installed is 3 msec one way. In the present example, control is performed at a cycle of 100 msec.

Figure 9:
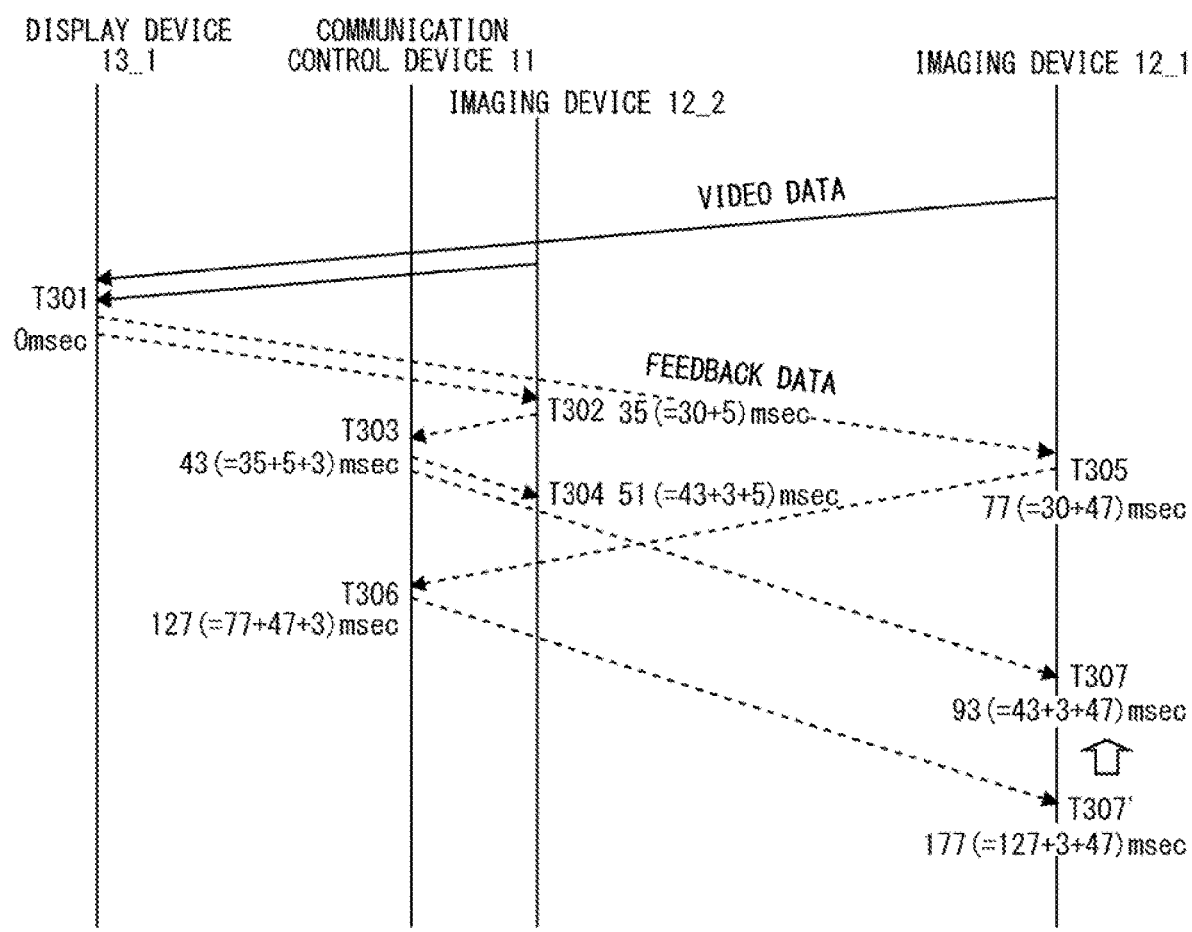
FIG. 9 is a diagram illustrating an effect of the first application case of the communication control system illustrated in FIG. 1.

With reference to FIG. 9, the difference (T307-T304) between the update times of the transmission conditions of the respective imaging devices 12_2 and 12_1 is 42 msec and is shorter than 126 msec that is the difference (T307'-T304) between the update times when the communication control system 1 is not applied.

(Second Application Case of Communication Control System 1)

Next, a second application case of the communication control system 1 is described with reference to FIG. 10.

Figure 10:
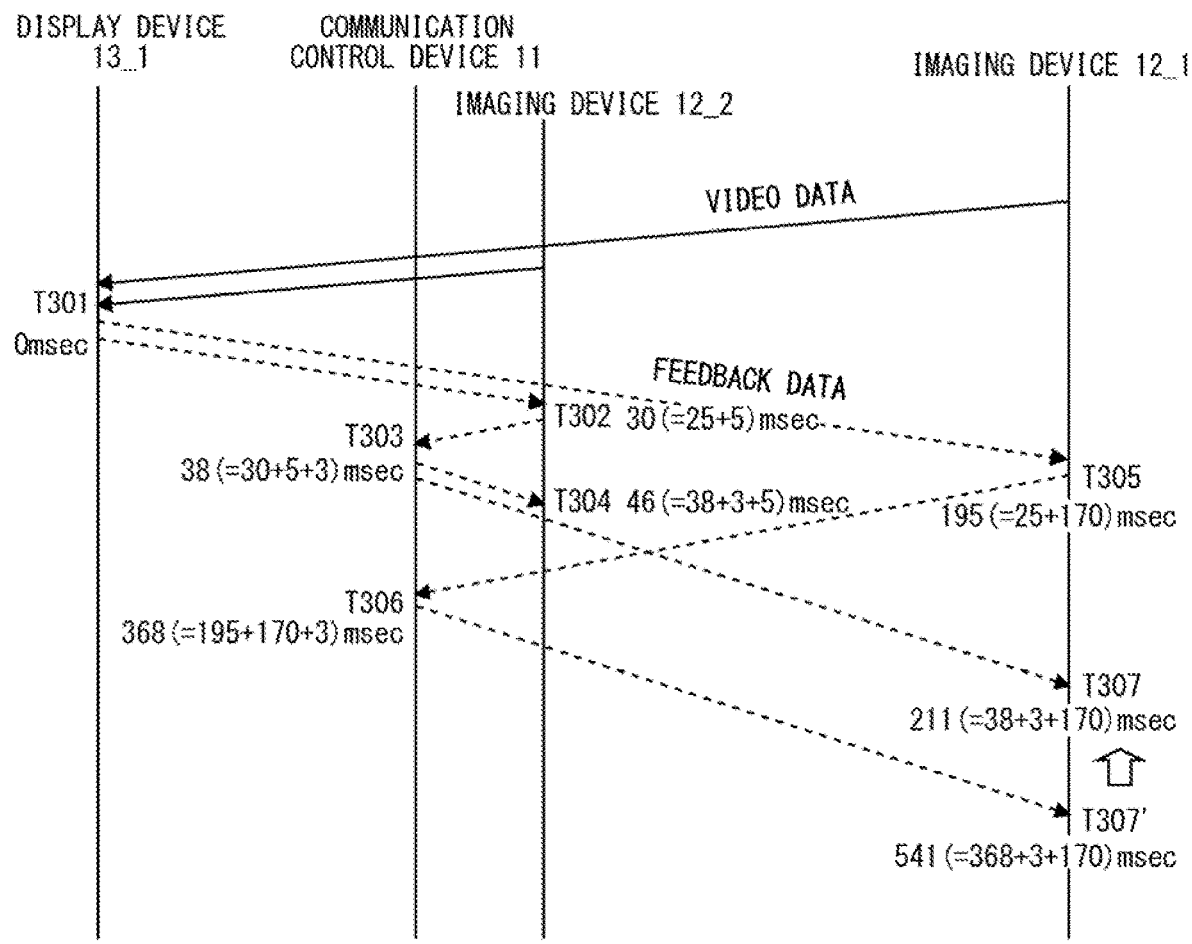
FIG. 10 is a diagram illustrating an effect of a second application case of the communication control system illustrated in FIG. 1.

FIG. 10 is a diagram illustrating an effect of the second application case of the communication control system 1.

In the present example, the communication control system 1 is applied not only in Japan but also overseas. In the present example, the communication time between the relay point IX of the network 40 and the imaging device 12_1 is 170 milliseconds (msec) one way. The communication time between the relay point IX and the imaging device 12_2 is 5 msec one way. The communication time between the relay point IX and the vehicle B1 equipped with the display device 13_1 is 25 msec one way. In addition, the communication time between the relay point IX and the management center C where the communication control device 11 is installed is 3 msec one way.

With reference to FIG. 10, the difference (T307-T304) between the update times of the transmission conditions of the respective imaging devices 12_2 and 12_1 is 165 msec and is 60% or more shorter than 495 msec that is the difference (T307'-T304) between the update times when the communication control system 1 is not applied.

Second Example Embodiment

Figure 11:
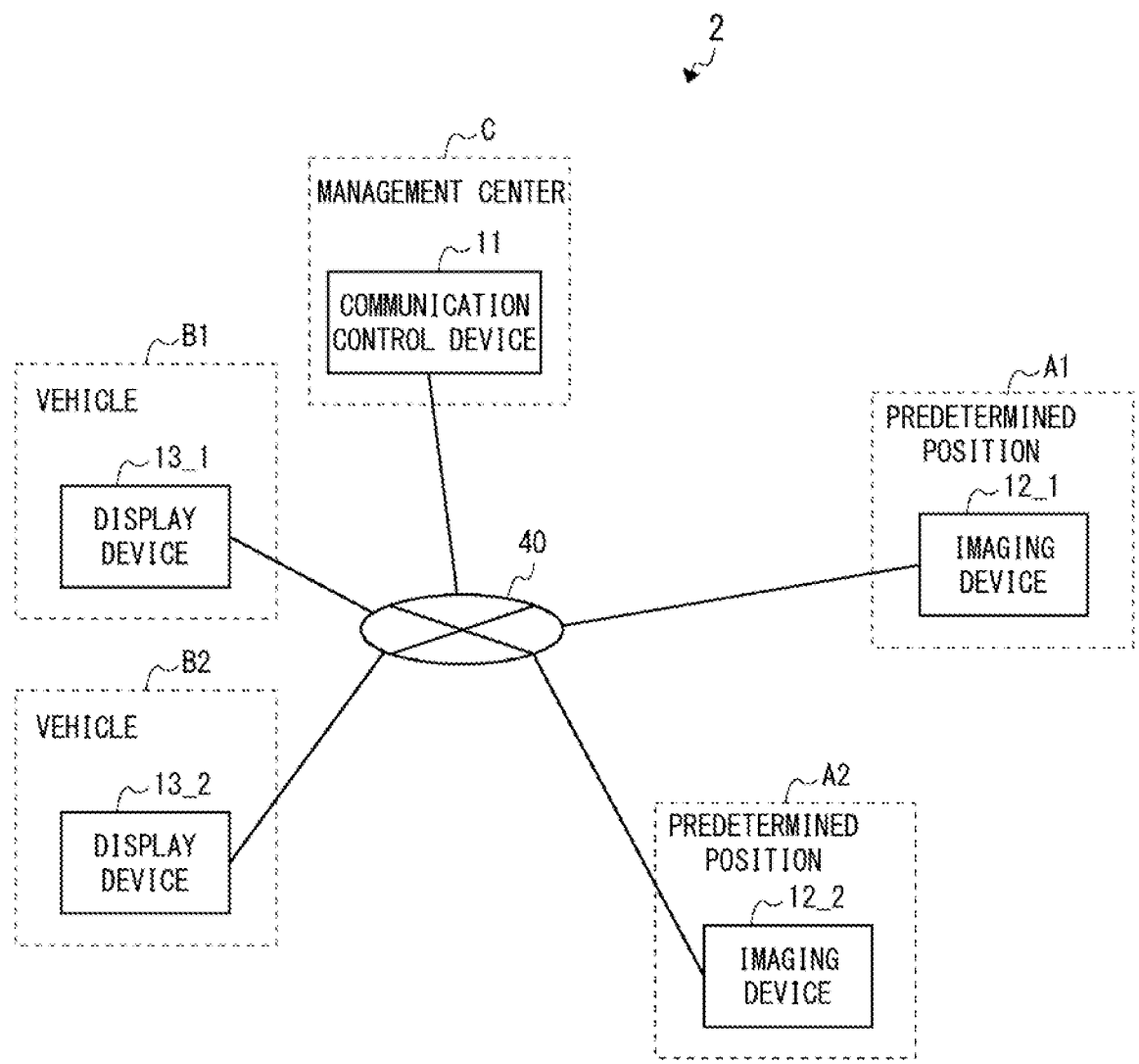
FIG. 11 is a block diagram illustrating a configuration example of a communication control system according to a second example embodiment.
Figure 12:
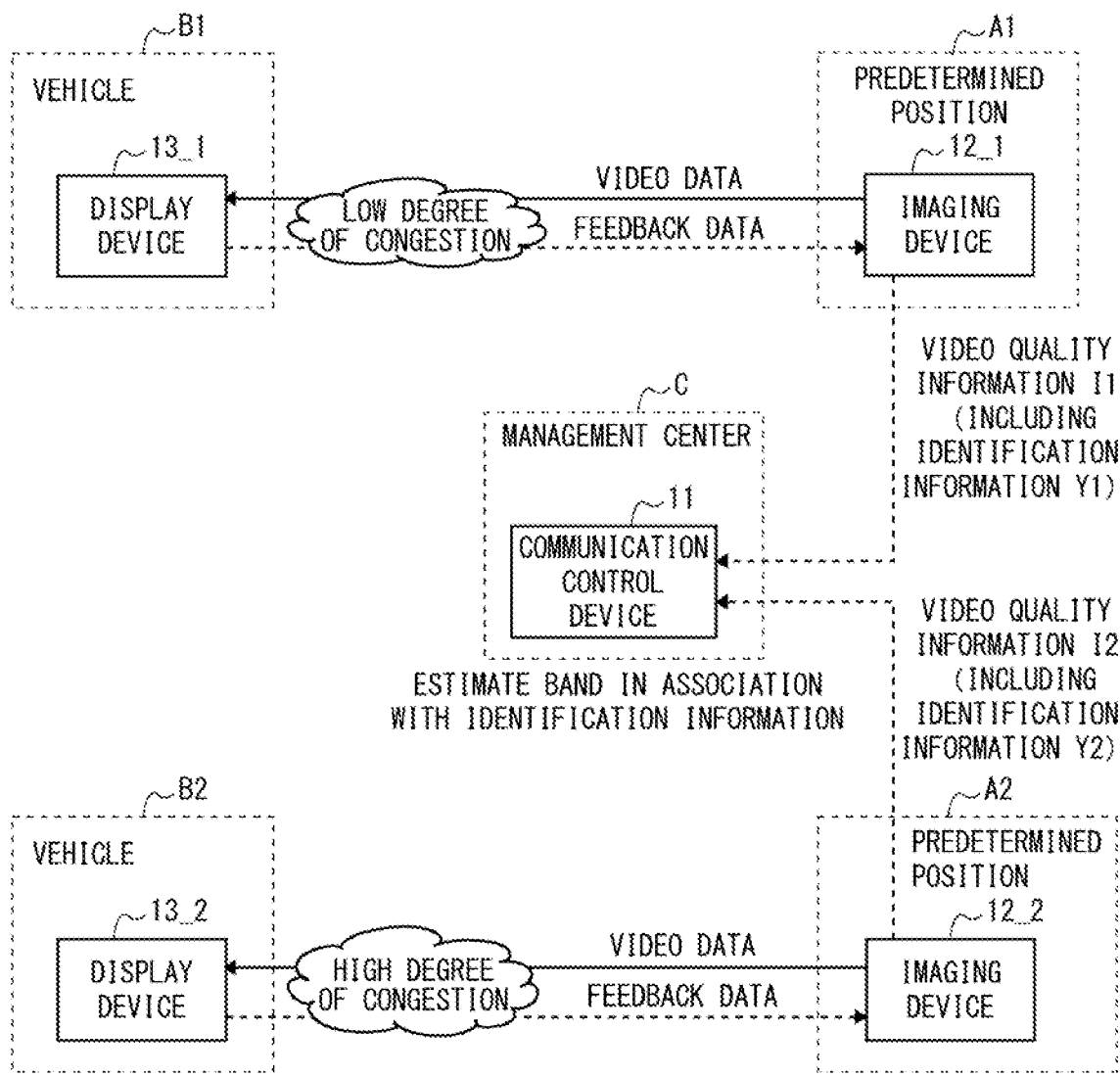
FIG. 12 is a diagram illustrating a flow of processing of the communication control system illustrated in FIG. 11.

FIG. 11 is a block diagram illustrating a configuration example of a communication control system 2 according to a second example embodiment. In addition, FIG. 12 is a diagram illustrating a flow of processing of the communication control system 2.

As illustrated in FIG. 11, the communication control system 2 further includes a display device 13_2 as compared with the communication control system 1. Other configurations of the communication control system 2 are same as in the case of the communication control device 11, and thus description thereof is omitted.

The display device 13_1 includes a monitor that displays a video imaged by the imaging device 12_1 and is mounted on, for example, the vehicle B1. The display device 13_2 includes a monitor that displays a video imaged by the imaging device 12_2 and is mounted on, for example, a vehicle B2.

Here, the data fed back from the display device 13_1 to the imaging device 12_1 includes identification information Y1 of the display device 13_1. The identification information Y1 is, for example, an IP address assigned to the display device 13_1. The imaging device 12_1 transmits the video quality information I1 including the identification information Y1 to the communication control device 11. Here, the data fed back from the display device 13_2 to the imaging device 12_2 includes identification information Y2 of the display device 13_2. The identification information Y2 is, for example, an IP address assigned to the display device 13_2. The imaging device 12_2 transmits the video quality information I2 including the identification information Y2 to the communication control device 11.

The communication control device 11 associates the transmission condition of the video data transmitted from the imaging device 12_1 to the display device 13_1 and the transmission condition of the video data transmitted from the imaging device 12_2 to the display device 13_2 with identification information Y1 and Y2, respectively. Accordingly, the communication control device 11 can individually control the transmission condition of the video data transmitted from the imaging device 12_1 to the display device 13_1 and the transmission condition of the video data transmitted from the imaging device 12_2 to the display device 13_2.

In addition, in the present example embodiment, the case where the display device 13_1 displays only the video imaged by the imaging device 12_1 on the monitor is described as an example, but the present invention is not limited thereto. For example, the display device 13_1 may display the videos imaged by the respective imaging devices 12_1 and 12_2 on the monitor. In the same manner, in the present example embodiment, the case where the display device 13_2 displays only the video imaged by the imaging device 12_2 on the monitor is described as an example, but the present invention is not limited thereto. For example, the display device 13_2 may display the videos imaged by the respective imaging devices 12_1 and 12_2 on the monitor.

In this case, the data fed back from the display device 13_1 to the respective imaging devices 12_1 and 12_2 includes identification information Y1 of the display device 13_1. The imaging device 12_1 transmits video quality information I1a (corresponding to I1) including the identification information Y1 to the communication control device 11. The imaging device 12_2 transmits video quality information I2a (corresponding to I2) including the identification information Y1 to the communication control device 11. Also, the communication control device 11 associates both the transmission condition of the video data transmitted from the imaging device 12_1 to the display device 13_1 and the transmission condition of the video data transmitted from the imaging device 12_2 to the display device 13_1 with the identification information Y1.

In addition, the data fed back from the display device 13_2 to the respective imaging devices 12_1 and 12_2 includes the identification information Y2 of the display device 13_2. The imaging device 12_1 transmits video quality information I1b (corresponding to I1) including the identification information Y2 to the communication control device 11. The imaging device 12_2 transmits video quality information I2b (corresponding to I2) including the identification information Y2 to the communication control device 11. Also, the communication control device 11 associates both the transmission condition of the video data transmitted from the imaging device 12_1 to the display device 13_2 and the transmission condition of the video data transmitted from the imaging device 12_2 to the display device 13_2 with the identification information Y2.

Accordingly, the communication control device 11 can individually control the video data transmitted from the respective imaging devices 12_1 and 12_2 to the display device 13_1 and can individually control the video data transmitted from the respective imaging devices 12_1 and 12_2 to the display device 13_2.

In addition, according to the present disclosure, any processing described as hardware processing can also be implemented by causing a CPU to execute a computer program.

In the above example, the program can be stored using various types of non-transitory computer-readable media and supplied to a computer. The non-transitory computer-readable media include various types of tangible storage media. Examples of the non-transitory computer-readable media include magnetic recording media (for example, a flexible disk, a magnetic tape, or a hard disk drive), magneto-optical recording media (for example, magneto-optical disks). In addition, examples of the non-transitory computer-readable medium include a compact disc-read only memory (CD-ROM), a CD-R, a CD-R/W, a digital versatile disc (DVD), and a semiconductor memory (for example, a mask ROM, a programmable ROM (PROM), an erasable PROM (EPROM), a flash ROM, or a random access memory (RAM)). In addition, the program may be supplied to the computer by various types of transitory computer-readable media. Examples of the transitory computer-readable medium include electric signals, optical signals, and electromagnetic waves. The transitory computer-readable medium can provide the program to the computer via a wired communication line such as electric wires and optical fibers or a wireless communication line.

Some or all of the above example embodiments may be described as the following supplementary notes but are not limited to the following.

Supplementary Note 1

A communication control device including:

an acquisition unit configured to acquire first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network;

a band estimation unit configured to estimate an available communication band of the second video data at reception time point of the second video data by the display device from the second video quality information acquired by the acquisition unit;

a band prediction unit configured to predict an available communication band of the first video data transmitted from the first imaging device to the display device based on a reception time difference between the first and second video quality information and predict an available communication band common to the first and second imaging devices based on the prediction result thereof and the estimation result by the band estimation unit; and a determination unit configured to determine transmission conditions of the respective items of first and second video data transmitted from the first and second imaging devices to the display device based on the available communication band common to the first and second imaging devices predicted by the band prediction unit.

Supplementary Note 2

The communication control device according to Supplementary Note 1, wherein the band prediction unit is configured to predict the available communication band of the first video data transmitted from the first imaging device to the display device with time obtained by subtracting a reception time difference between the first and second video quality information from the reception time of the first video data by the display device as a base point.

Supplementary Note 3

The communication control device according to Supplementary Note 1 or 2, wherein the determination unit is configured to determine transmission conditions of the respective items of first and second video data transmitted from the first and second imaging devices to the display device based on imaging priorities of the respective first and second imaging devices in addition to the available communication band common to the first and second imaging devices predicted by the band prediction unit.

Supplementary Note 4

The communication control device according to any one of Supplementary Notes 1 to 3, wherein
the first and second video quality information include identification information of the display device, and
the determination unit is configured to associate transmission conditions of the respective items of first and second video data transmitted from the first and second imaging devices to the display device with the identification information of the display device.

Supplementary Note 5

A communication control system including:
the communication control device according to Supplementary Note 1;
the first imaging device;
the second imaging device; and
the display device configured to receive the first video data transmitted by the first imaging device and the second video data transmitted by the second imaging device via the network and display the video.

Supplementary Note 6

The communication control system according to Supplementary Note 5, wherein
the display device at least includes
a measurement unit configured to measure reception statuses of the respective items of first and second video data, and
a feedback transmission unit configured to feed back measurement results by the measurement unit respectively to the first and second imaging devices via the network,
the first imaging device at least includes
a first detection unit configured to detect the first video quality information of the first video data on the display device based on the measurement result by the measurement unit fed back from the display device and the transmission status of the first video data transmitted by the first imaging device, and
the second imaging device at least includes
a second detection unit configured to detect the second video quality information of the second video data on the display device based on the measurement result by the measurement unit fed back from the display device and the transmission status of the second video data transmitted by the second imaging device.

Supplementary Note 7

The communication control system according to Supplementary Note 6, wherein
the first imaging device further includes
a first encryption unit configured to encrypt the first video data,
a first transmission unit configured to transmit the first video data encrypted by the first encryption unit,
a first reception unit configured to receive the measurement result by the measurement unit, which is fed back by the display device and encrypted, and
a first decryption unit configured to decrypt the measurement result by the measurement unit, which is received by the first reception unit and encrypted,
the second imaging device further includes
a second encryption unit configured to encrypt the second video data,
a second transmission unit configured to transmit the second video data encrypted by the second encryption unit,
a second reception unit configured to receive the measurement result by the measurement unit, which is fed back by the display device and encrypted, and
a second decryption unit configured to decrypt the measurement result by the measurement unit, which is received by the second reception unit and encrypted,
the display device further includes
a display device-side reception unit configured to receive the first video data transmitted from the first imaging device and encrypted and the second video data transmitted from the second imaging device and encrypted,
a display device-side decryption unit configured to decrypt the first video data and the second video data, which are received by the display device-side reception unit, and
a display device-side encryption unit configured to encrypt the measurement result by the measurement unit, and
the feedback transmission unit is configured to feed back the measurement result by the measurement unit, which is encrypted by the display device-side encryption unit to the first imaging device and the second imaging device via the network.

Supplementary Note 8

The communication control system according to any one of Supplementary Notes 5 to 7, wherein the band prediction unit is configured to predict the available communication band of the first video data transmitted from the first imaging device to the display device with time obtained by subtracting a reception time difference between the first and second video quality information from the reception time of the first video data by the display device as a base point.

Supplementary Note 9

The communication control system according to any one of Supplementary Notes 5 to 8, wherein the determination unit is configured to determine transmission conditions of the respective items of first and second video data transmitted from the first and second imaging devices to the display device based on imaging priorities of the respective first and second imaging devices in addition to the available communication band common to the first and second imaging devices predicted by the band prediction unit.

Supplementary Note 10

The communication control system according to any one of Supplementary Notes 5 to 9, wherein
the first and second video quality information include identification information of the display device, and
the determination unit is configured to associate transmission conditions of the respective items of first and second video data transmitted from the first and second imaging devices to the display device with the identification information of the display device.

Supplementary Note 11

The communication control system according to any one of Supplementary Notes 5 to 10, wherein
the first imaging device and the second imaging device are installed at different predetermined positions, respectively,
the display device is mounted on a vehicle, and
the communication control device is installed in a management sensor.

Supplementary Note 12

The communication control system according to any one of Supplementary Notes 5 to 10, wherein
the first imaging device, the second imaging device, and the display device are mounted on different vehicles, respectively, and
the communication control device is installed in a management sensor.

Supplementary Note 13

A communication control method including:
an acquisition step of acquiring first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network;
a band estimation step of estimating an available communication band of the second video data at reception time point of the second video data by the display device from the second video quality information acquired in the acquisition step;
a band prediction step of predicting an available communication band of the first video data transmitted from the first imaging device to the display device based on a reception time difference between the first and second video quality information and predicting an available communication band common to the first and second imaging devices based on the prediction result thereof and the estimation result in the band estimation step; and
a determination step of determining transmission conditions of the respective items of first and second video data transmitted from the first and second imaging devices to the display device based on the available communication band common to the first and second imaging devices predicted in the band prediction step.

Supplementary Note 14

The communication control method according to Supplementary Note 13, wherein, in the band prediction step, the available communication band of the first video data transmitted from the first imaging device to the display device is configured to be predicted with time obtained by subtracting a reception time difference between the first and second video quality information from the reception time of the first video data by the display device as a base point.

Supplementary Note 15

The communication control method according to Supplementary Note 13 or 14, wherein, in the determination step, transmission conditions of the respective items of first and second video data transmitted from the first and second imaging devices to the display device are configured to be determined based on imaging priorities of the respective first and second imaging devices in addition to the available communication band common to the first and second imaging devices predicted in the band prediction step.

Supplementary Note 16

The communication control method according to any one of Supplementary Notes 13 to 15, wherein
the first and second video quality information includes identification information of the display device, and
in the determination step, transmission conditions of the respective items of first and second video data transmitted from the first and second imaging devices to the display device are configured to be associated with the identification information of the display device.

Supplementary Note 17

A non-transitory computer-readable medium storing a communication control program for executing:
an acquisition process of acquiring first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network;
a band estimation process of estimating an available communication band of the second video data at reception time point of the second video data by the display device from the second video quality information acquired in the acquisition process;

a band prediction process of predicting an available communication band of the first video data transmitted from the first imaging device to the display device based on a reception time difference between the first and second video quality information and predicting an available communication band common to the first and second imaging devices based on the prediction result thereof and the estimation result in the band estimation process; and a determination process of determining transmission conditions of the respective items of first and second video data transmitted from the first and second imaging devices to the display device based on the available communication band common to the first and second imaging devices predicted in the band prediction process.

Supplementary Note 18

The non-transitory computer-readable medium storing a communication control program according to Supplementary Note 17, wherein, in the band prediction process, the available communication band of the first video data transmitted from the first imaging device to the display device is configured to be predicted with time obtained by subtracting a reception time difference between the first and second video quality information from the reception time of the first video data by the display device as a base point.

(Supplement Note 19)

The non-transitory computer-readable medium storing a communication control program according to Supplementary Note 17 or 18, wherein, in the determination process, transmission conditions of the respective items of first and second video data transmitted from the first and second imaging devices to the display device are configured to be determined based on imaging priorities of the respective first and second imaging devices in addition to the available communication band common to the first and second imaging devices predicted in the band prediction process.

Supplementary Note 20

The non-transitory computer-readable medium storing a communication control program according to any one of Supplementary Notes 17 to 19, wherein
the first and second video quality information include identification information of the display device, and
in the determination process, transmission conditions of the respective items of first and second video data transmitted from the first and second imaging devices to the display device are configured to be associated with the identification information of the display device.

Although the invention of the present application has been described above with reference to the example embodiments, the invention of the present application is not limited to the above example embodiments. Various modifications that can be understood by those skilled in the art can be made to the configuration and details of the invention of the present application within the scope of the invention of the present application.

REFERENCE SIGNS LIST

1 COMMUNICATION CONTROL SYSTEM
2 COMMUNICATION CONTROL SYSTEM
5 COMMUNICATION CONTROL SYSTEM
11 COMMUNICATION CONTROL DEVICE
12_1 IMAGING DEVICE
12_2 IMAGING DEVICE
13_1 DISPLAY DEVICE
13_2 DISPLAY DEVICE
40 NETWORK
51 COMMUNICATION CONTROL DEVICE
52_1 IMAGING DEVICE
52_2 IMAGING DEVICE
53_1 DISPLAY DEVICE
50 NETWORK
111 COMMUNICATION UNIT
112 CONTROL UNIT
121 IMAGING UNIT
122 COMMUNICATION UNIT
123 ENCRYPTION UNIT
124 DECRYPTION UNIT
125 VIDEO QUALITY INFORMATION DETECTION UNIT
126 CONTROL UNIT
131 COMMUNICATION UNIT
132 DISPLAY UNIT
133 DECRYPTION UNIT
134 ENCRYPTION UNIT
135 RECEPTION STATUS MEASUREMENT UNIT
1121 BAND ESTIMATION UNIT
1122 BAND PREDICTION UNIT
1123 PARAMETER DETERMINATION UNIT
A1 VEHICLE
A2 VEHICLE
B1 VEHICLE
B2 VEHICLE
C MANAGEMENT CENTER
IX RELAY POINT
Y1 IDENTIFICATION INFORMATION
Y2 IDENTIFICATION INFORMATION

What is claimed is:

1. A communication control device comprising:
at least one first memory storing program instructions; and
at least one first processor configured to execute the program instructions stored in the first memory to:
acquire first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network;
estimate an available communication band of the second video data at reception time point of the second video data by the display device from the second video quality information;
predict an available communication band of the first video data transmitted from the first imaging device to the display device based on a reception time difference between the first and second video quality information and predict an available communication band common to the first and second imaging devices based on the prediction result about the available communication band of the first video data and the estimation result about the available communication band of the second video data; and determine transmission conditions of the respective items of first and second video data transmitted from the first and second imaging devices to the display device based on the available communication band common to the first and second imaging devices.

2. The communication control device according to claim 1, wherein in the available band prediction, the available communication band of the first video data transmitted from the first imaging device to the display device is predicted with time obtained by subtracting a reception time difference between the first and second video quality information from the reception time of the first video data by the display device as a base point.

3. The communication control device according to claim 1, wherein in the determination of the transmission conditions of the respective items of first and second video data, transmission conditions of the respective items of first and second video data transmitted from the first and second imaging devices to the display device are determined based on imaging priorities of the respective first and second imaging devices in addition to the available communication band common to the first and second imaging devices.

4. The communication control device according to claim 1, wherein
the first and second video quality information include identification information of the display device, and
in the determination of the transmission conditions of the respective items of first and second video data, transmission conditions of the respective items of first and second video data transmitted from the first and second imaging devices to the display device are associated with the identification information of the display device.

5. A communication control system comprising:
the communication control device according to claim 1;
the first imaging device;
the second imaging device; and
the display device configured to receive the first video data transmitted by the first imaging device and the second video data transmitted by the second imaging device via the network and display the video.

6. The communication control system according to claim 5, wherein in the available band prediction, the available communication band of the first video data transmitted from the first imaging device to the display device is predicted with time obtained by subtracting a reception time difference between the first and second video quality information from the reception time of the first video data by the display device as a base point.

7. The communication control system according to claim 5, wherein in the determination of the transmission conditions of the respective items of first and second video data, transmission conditions of the respective items of first and second video data transmitted from the first and second imaging devices to the display device are determined based on imaging priorities of the respective first and second imaging devices in addition to the available communication band common to the first and second imaging devices.

8. The communication control system according to claim 5, wherein
the first and second video quality information include identification information of the display device, and
in the determination of the transmission conditions of the respective items of first and second video data, transmission conditions of the respective items of first and second video data transmitted from the first and second imaging devices to the display device are associated with the identification information of the display device.

9. The communication control system according to claim 5, wherein
the first imaging device and the second imaging device are installed at different predetermined positions, respectively,
the display device is mounted on a vehicle, and
the communication control device is installed in a management center.

10. The communication control system according to claim 5, wherein
the first imaging device, the second imaging device, and the display device are mounted on different vehicles, respectively, and
the communication control device is installed in a management center.

11. A communication control method comprising:
acquiring first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network;
estimating an available communication band of the second video data at reception time point of the second video data by the display device from the second video quality information;
predicting an available communication band of the first video data transmitted from the first imaging device to the display device based on a reception time difference between the first and second video quality information and predicting an available communication band common to the first and second imaging devices based on the prediction result about the available communication band of the first video data and the estimation result about the available communication band of the second video data; and
determining transmission conditions of the respective items of first and second video data transmitted from the first and second imaging devices to the display device based on the available communication band common to the first and second imaging devices.

12. The communication control method according to claim 11, wherein, in the available band prediction, the available communication band of the first video data transmitted from the first imaging device to the display device is configured to be predicted with time obtained by subtracting a reception time difference between the first and second video quality information from the reception time of the first video data by the display device as a base point.

13. The communication control method according to claim 11, wherein, in the determination of the transmission conditions of the respective items of first and second video data, transmission conditions of the respective items of first and second video data transmitted from the first and second imaging devices to the display device are configured to be determined based on imaging priorities of the respective first and second imaging devices in addition to the available communication band common to the first and second imaging devices.

14. The communication control method according to claim 11, wherein
the first and second video quality information include identification information of the display device, and
in the determination of the transmission conditions of the respective items of first and second video data, transmission conditions of the respective items of first and second video data transmitted from the first and second imaging devices to the display device are configured to be associated with the identification information of the display device.

15. A non-transitory computer-readable medium storing a communication control program for executing:
an acquisition process of acquiring first video quality information of first video data on a display device, detected based on a transmission status of the first video data transmitted by a first imaging device and a reception status of the first video data on the display device that receives the first video data via a network and second video quality information of second video data on the display device, detected based on a transmission status of the second video data transmitted by a second imaging device provided at a position closer than the first imaging device and a reception status of the second video data on the display device that receives the second video data via the network;
a band estimation process of estimating an available communication band of the second video data at reception time point of the second video data by the display device from the second video quality information acquired in the acquisition process;
a band prediction process of predicting an available communication band of the first video data transmitted from the first imaging device to the display device based on a reception time difference between the first and second video quality information and predicting an available communication band common to the first and second imaging devices based on the prediction result thereof and the estimation result in the band estimation process; and
a determination process of determining transmission conditions of the respective items of first and second video data transmitted from the first and second imaging devices to the display device based on the available communication band common to the first and second imaging devices predicted in the band prediction process.

16. The non-transitory computer-readable medium storing a communication control program according to claim 15, wherein, in the band prediction process, the available communication band of the first video data transmitted from the first imaging device to the display device is configured to be predicted with time obtained by subtracting a reception time difference between the first and second video quality information from the reception time of the first video data by the display device as a base point.

17. The non-transitory computer-readable medium storing a communication control program according to claim 15, wherein, in the determination process, transmission conditions of the respective items of first and second video data transmitted from the first and second imaging devices to the display device are configured to be determined based on imaging priorities of the respective first and second imaging devices in addition to the available communication band common to the first and second imaging devices predicted in the band prediction process.

18. The non-transitory computer-readable medium storing a communication control program according to claim 15, wherein
the first and second video quality information include identification information of the display device, and
in the determination process, transmission conditions of the respective items of first and second video data transmitted from the first and second imaging devices to the display device are configured to be associated with the identification information of the display device.

* * * * *